US009444516B2

(12) United States Patent
Wang et al.

(10) Patent No.: US 9,444,516 B2
(45) Date of Patent: Sep. 13, 2016

(54) METHOD, APPARATUS AND SYSTEM FOR SUPPORTING NON-VECTOR LINE

(71) Applicant: HUAWEI TECHNOLOGIES CO., LTD., Shenzhen (CN)

(72) Inventors: Xiang Wang, Shenzhen (CN); Cheng Li, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 235 days.

(21) Appl. No.: 14/164,789

(22) Filed: Jan. 27, 2014

(65) Prior Publication Data

US 2014/0140187 A1    May 22, 2014

Related U.S. Application Data

(63) Continuation of application No. PCT/CN2011/077675, filed on Jul. 27, 2011.

(51) Int. Cl.
  *H04J 1/12* (2006.01)
  *H04B 3/32* (2006.01)
  *H04M 11/06* (2006.01)

(52) U.S. Cl.
  CPC .............. *H04B 3/32* (2013.01); *H04M 11/062* (2013.01)

(58) Field of Classification Search
  USPC .............. 370/201, 252, 286, 287, 288, 289
  See application file for complete search history.

(56) References Cited

U.S. PATENT DOCUMENTS

2009/0046568 A1* 2/2009 Xu .................... H04L 25/03343
                                                         370/201
2009/0175156 A1   7/2009 Xu
                        (Continued)

FOREIGN PATENT DOCUMENTS

| CN | 1965498 | 5/2007 |
| CN | 101213826 A | 7/2008 |
| WO | 2005/094428 A2 | 10/2005 |

OTHER PUBLICATIONS

International Search Report completed Apr. 16, 2012 in corresponding International Patent Application No. PCT/CN2011/077675.

(Continued)

*Primary Examiner* — Ricky Ngo
*Assistant Examiner* — Christine Ng
(74) *Attorney, Agent, or Firm* — Staas & Halsey LLP

(57) ABSTRACT

Embodiments of the present invention provide a method, an apparatus, and a system for supporting a non-vector line. The method includes: selecting n non-vector lines $T_L$ from lines that are in an initializing stage, where n is an integer greater than or equal to 1; controlling to perform no further initializing for other lines that are in the initializing stage except the $T_L$ until the $T_L$ fully enters a data transmission stage; and before the $T_L$ enters the data transmission stage, estimating a far-end crosstalk coefficient $C_{TL-SV}$ from the $T_L$ to a vector line $S_V$ that is in the data transmission stage, where the $C_{TL-SV}$ is used in signal processing to eliminate far-end crosstalk caused by the $T_L$ to the $S_V$.

11 Claims, 12 Drawing Sheets

(56) References Cited

U.S. PATENT DOCUMENTS

| | | | |
|---|---|---|---|
| 2009/0271550 A1* | 10/2009 | Clausen | H04L 25/085 710/269 |
| 2010/0278328 A1 | 11/2010 | Mahadevan et al. | |
| 2011/0007623 A1 | 1/2011 | Cendrillon et al. | |
| 2011/0080938 A1 | 4/2011 | Fisher et al. | |
| 2011/0286503 A1 | 11/2011 | Cioffi et al. | |
| 2012/0195183 A1* | 8/2012 | Nuzman | H04B 7/0848 370/201 |
| 2012/0275591 A1* | 11/2012 | Mahadevan | H04B 3/32 379/417 |
| 2013/0142319 A1* | 6/2013 | Lu | H04B 3/32 379/93.08 |

OTHER PUBLICATIONS

M. Mohseni et al., "G. Vector: A Backward-Compatible Crosstalk Channel Estimation Method for Downstream Vectoring," *ITU—Telecommunications Standardization Sector: Study Group 15*, Dec. 2007, 9 pages.

J. Maes et al., "Pilot-Based Crosstalk Channel Estimation for Vector-Enabled VDSL Systems," *44th Annual Conference on Information Sciences and Systems*, Mar. 2010, 6 pages.

V. Oksman et al., "The ITU-T's New G. vector Standard Proliferates 100 Mb/s DSL," *IEEE Communications Magazine*, Oct. 2010, pp. 140-148.

"Series G: Transmission Systems and Media, Digital Systems and Networks," *Telecommunications Standardization Sector of ITU G. 993.2, Amendment 7*, Jun. 2011, pp. i-iii, 1-73, & 4 cover pages.

Extended European Search Report Issued on Jun. 27, 2014 in corresponding European Patent Application No. 11 85 8007.

Whiting P et al.: "DSL Crosstalk Coefficient Acquisition Using SNR Feedback", Global Telecommunications Conference, 2008. IEEE GLOBECOM 2008. IEEE,IEEE Piscataway, NJ, USA, Nov. 30, 2008, pp. 1-5, XP031370341, ISBN: 978-1-4244-2324-8.

Chinese Office Action issued on May 29, 2014 in corresponding Chinese Patent Application No. 201180001370.1.

Search Report issued on May 21, 2014 in corresponding Chinese Patent Application No. 2011800013701.

\* cited by examiner

METHOD, APPARATUS AND SYSTEM FOR SUPPORTING NON-VECTOR LINE

CROSS-REFERENCE TO RELATED APPLICATIONS

This application is a continuation of International Application No. PCT/CN2011/077675, filed on Jul. 27, 2011, which is hereby incorporated by reference in its entirety.

TECHNICAL FIELD

Embodiments of the present invention relate to the data communication field, and in particular, to a method, an apparatus and a system for supporting a non-vector line in a vectored-DSL system.

BACKGROUND

A digital subscriber line (xDSL) is a high-speed data transmission technique on an unshielded twisted pair (UTP). FIG. 1 shows a system reference model of a system DSL access multiplexer DSLAM (DSL Access Multiplexer) that provides multiple xDSL access.

Due to electromagnetic induction, mutual interference occurs between multiple signals of DSLAM access, which is called crosstalk. As shown in FIG. 2, near-end crosstalk NEXT (Near-End Crosstalk) energy and far-end crosstalk FEXT (Far-End Crosstalk) energy increase with the increase of the frequency. Frequency division multiplexing is applied to xDSL uplink and downlink channels, and near-end crosstalk does not cause too much harm to system performance. However, when wider and wider bands are applied to xDSL, far-end crosstalk affects transmission performance of the line more seriously.

Currently, a vectored-DSL (vectored-DSL) technology is put forward in the industry. It primarily takes advantage of the possibility of joint transmitting and receiving on a DSLAM side and uses a signal processing method to cancel FEXT interference and finally eliminate FEXT interference in each signal. FIG. 3 and FIG. 4 illustrate working scenarios of synchronous transmitting and synchronous receiving on the DSLAM side respectively.

In vectored-DSL, a downlink precoding matrix P and an uplink cancellation matrix W need to be estimated. In a vectored-DSL system, the following steps are performed:

1. Sync symbol (Sync Symbol) alignment is implemented, where the sync symbol is a DMT symbol synchronization signal that carries a synchronization frame.

2. A vectoring control entity VCE (Vectoring Control Entity) allocates pilot sequences to all lines in a unified manner and an ONU-side VDSL2 transceiver unit at the Optical network unit (VTU-O) of each line jointly modulates the pilot sequence, which are allocated by the VCE, on the Sync Symbols of all lines.

3. The receiver side feeds back an error to the VCE.

The downlink precoding matrix P and the uplink cancellation matrix W can be estimated in the VCE first, and then the vectoring technology is applied to cancel the FEXT. The downlink precoding matrix is also known as a downlink crosstalk cancellation matrix or a downlink far-end crosstalk coefficient, and the uplink cancellation matrix is also known as an uplink crosstalk cancellation matrix or an uplink far-end crosstalk coefficient.

A process of initializing a new line that joins in (Join in) ordinary non-vectored VDSL2 lines or vectored-DSL vector lines in the prior art includes handshake (Handshake), channel discovery (Channel Discovery), training (Training), and channel analysis and exchange (Channel Analysis and Exchange). After initializing is finished, a data transmission (Showtime) stage comes. The Channel Discovery stage of an ordinary non-vectored VDSL2 line further includes an O-P-Channel-Discovery 1 stage and an R-P-Channel-Discovery 1 stage; and the Training stage further includes an O-P-Training 1 stage and an R-P-Training 1 stage. For the initializing of the vectored-DSL vector line, before the data transmission (Showtime) stage, an O-P-VECTOR 1 stage and an R-P-VECTOR 1 stage are inserted in the Channel Discovery stage, and an O-P-VECTOR 1-1 stage, an O-P-VECTOR 2-1 stage, an R-P-VECTOR 1-1 stage, an R-P-VECTOR 1-2 stage, and an R-P-VECTOR 2 stage are inserted in the Training stage. Within such stages, all and/or part of the downlink precoding matrix P and uplink cancellation matrix W may be estimated.

The vectored-DSL is a very-high-speed digital subscriber line 2 (VDSL2) for far-end self-crosstalk elimination. Because the VDSL2 technology is earlier than the vectored-DSL technology and has been applied widely, the upgrade from the VDSL2 to the vectored-DSL must allow for support of legacy lines, that is, ordinary non-vectored VDSL2 lines. A customer premises equipment (CPE) of a legacy line is a VDSL2 legacy CPE that does not support the vectored DSL. However, the VDSL2 legacy CPE does not support sending and receiving of a pilot sequence and feedback of an error on the Sync Symbol, which makes it difficult for the VCE to estimate the uplink and downlink far-end crosstalk coefficients intended for cancelling the crosstalk caused by the legacy line onto the vector line. If some lines in the system are in the data transmission (Showtime) stage, when a legacy line joins in the system, in the case that the crosstalk from the legacy line is not cancelled, the bit errors of the vector line in the Showtime stage will increase due to a lower signal-to-noise ratio (SNR), or even the vector line in the Showtime stage is deactivated and retrained. As a latent uncertain factor, the legacy line seriously affects the rate of the vector line and the stability of the entire vectored-DSL system.

If all VDSL2 legacy CPEs in the VDSL2 of the live network are upgraded to or replaced with vectored-DSL enabled vector customer premises equipment VDSL2 vector CPE, huge costs are required. Some old legacy CPEs may not be upgradable to the vector CPE for various reasons such as no support of error calculation, error feedback, or uplink sending of pilot sequences, which makes it necessary to replace the entire CPE and further increases costs.

As regards the issue of the vectored-DSL being down-compatible with the legacy CPE, a vector friendly (vector Friendly) CPE solution is put forward in the industry. Specifically, the solution specifies that the vector Friendly CPE must be able to identify and receive a pilot signal modulated on a downlink Sync Symbol, and additionally, a VTU-O controls downlink Sync Symbol alignment of all lines. When the vectored-DSL system meets the above two conditions, for the vector line, the VCE can estimate a downlink cancellation coefficient for cancelling legacy line crosstalk. In this way, the potential stability trouble caused by the legacy line onto the vector line in the entire vectored-DSL system is eliminated in the downlink direction. In the application of the vector Friendly solution, the legacy CPE in the live network still needs to be upgraded to the vector Friendly CPE, which requires a high cost. Because the vector Friendly CPE is unable to send uplink pilot signals, the VCE can hardly estimate the far-end crosstalk coefficient intended for cancelling the crosstalk caused by the legacy line in the uplink direction onto the vector line. Consequently, the potential stability trouble caused by the legacy line onto the vector line in the vectored-DSL system is not eliminated in the uplink direction.

SUMMARY

Embodiments of the present invention aim to solve the following technical problem: supporting a VDSL2 legacy CPE of a live network in a vectored-DSL system, and eliminating impacts caused by a legacy line connected to the VDSL2 legacy CPE, which is a non-vector line, onto stability of a vector line in the entire vectored-DSL system, that is, eliminating far-end crosstalk caused by the legacy line onto the vector line.

In one aspect, an embodiment of the present invention provides a method for supporting a non-vector line, including:

selecting n non-vector lines $T_L$ from lines that are in an initializing stage, where n is an integer greater than or equal to 1;

controlling to perform no further initializing for other lines that are in the initializing stage except the $T_L$ until the $T_L$ fully enters a data transmission stage; and before the $T_L$ enters the data transmission stage, estimating a far-end crosstalk coefficient $C_{TL\text{-}SV}$ from the $T_L$ to a vector line $S_V$ that is in the data transmission stage, where the $C_{TL\text{-}SV}$ is used in signal processing to eliminate far-end crosstalk caused by the $T_L$ to the $S_V$.

In another aspect, an embodiment of the present invention provides an apparatus for supporting a non-vector line, including:

a non-vector line selecting unit, configured to select n non-vector lines $T_L$ from lines that are in an initializing stage, where n is an integer greater than or equal to 1;

a non-vector line initializing controlling unit, configured to control to perform no further initializing for other lines that are in the initializing stage except the $T_L$ until the $T_L$ fully enters a data transmission stage; and a non-vector line far-end crosstalk coefficient estimating unit, configured to estimate, before the $T_L$ enters the data transmission stage, a far-end crosstalk coefficient $C_{TL\text{-}SV}$ from the $T_L$ to a vector line $S_V$ that is in the data transmission stage, where the $C_{TL\text{-}SV}$ is used in signal processing to eliminate far-end crosstalk caused by the $T_L$ to the $S_V$.

In another aspect, an embodiment of the present invention provides a system for supporting a non-vector line, including:

a VCE, at least two lines, and an VTU-O, where: the at least two lines include at least one vector line and at least one non-vector line, and the at least two lines are connected to the VTU-O and controlled by the VTU-O, where the at least one vector line is connected to a corresponding ONU-side vector transceiver unit VTU-O-v and controlled by the VTU-O-v, and the at least one non-vector line is connected to a corresponding ONU-side vector transceiver unit VTU-O-l and controlled by the VTU-O-l;

the VCE selects n non-vector lines $T_L$ from lines that are in an initializing stage, where n is an integer greater than or equal to 1;

the VCE controls ONU-side vector transceiver units corresponding to other lines that are in the initializing stage except the $T_L$, so as to perform no further initializing for the other lines until the $T_L$ fully enters a data transmission stage; and before the $T_L$ enters the data transmission stage, the VCE estimates a far-end crosstalk coefficient $C_{TL\text{-}SV}$ from the $T_L$ to a vector line $S_V$ that is in the data transmission stage, where the $C_{TL\text{-}SV}$ is used in signal processing to eliminate far-end crosstalk caused by the $T_L$ to the $S_V$.

In the embodiments of the present invention, a vectored-DSL system can support existing VDSL legacy CPEs in a live network without upgrading the VDSL2 legacy CPEs in the live network of VDSL2, and, by controlling initializing of a vector CPE and a legacy CPE in an orderly way, cancel the crosstalk from the legacy line to the vector line in the downlink direction, cancel the crosstalk from the legacy line to the vector line in the uplink direction to the utmost, and therefore, massively relieve potential stability troubles caused by the legacy line to the vector line in the entire vectored-DSL system.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Non-vector lines in the embodiments of the present invention are legacy ordinary VDSL2 lines, including existing lines that use a VDSL2 customer premises equipment CPE that does not support sending and receiving of pilot sequences and feedback of an error sample on a Sync Symbol.

In the embodiments of the present invention, symbols in Table 1 are used to represent lines in different stages. $S_V$ represents a vector line in the Showtime stage, $S_L$ represents a legacy line in the Showtime stage, $J_V$ represents a vector line in the initializing (Initializing) stage, $J_L$ represents a legacy line in the Initializing stage, V represents all vector lines including $S_V$ and $J_V$, and L represents all legacy lines including $S_L$ and $J_L$. The symbols in Table 1 may be regarded as representing the corresponding line sets, respectively.

TABLE 1

|  | Showtime<br>In the data transmission stage | Join in<br>In the initializing stage |
|---|---|---|
| Vector line set | $S_V$ | $J_V$ |
| Legacy line set | $S_L$ | $J_L$ |

Figure 1:
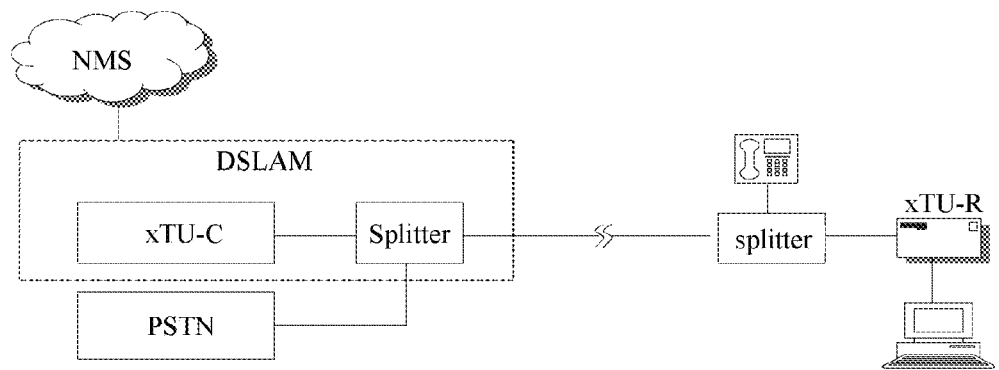
FIG. 1 is an xDSL system reference model.
Figure 2:
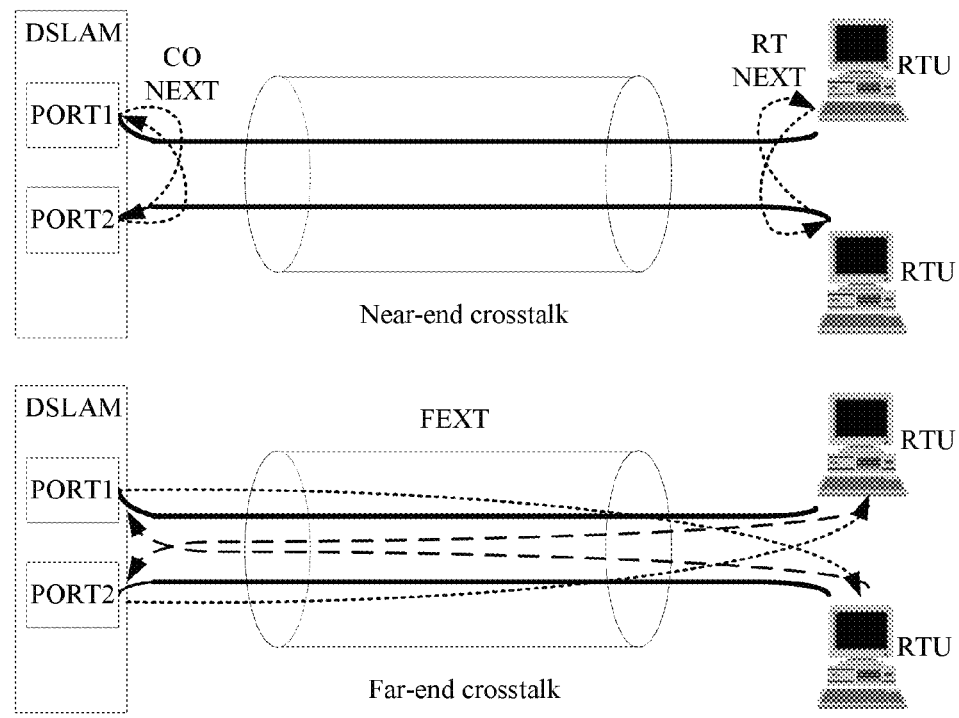
FIG. 2 is a line crosstalk model.
Figure 3:
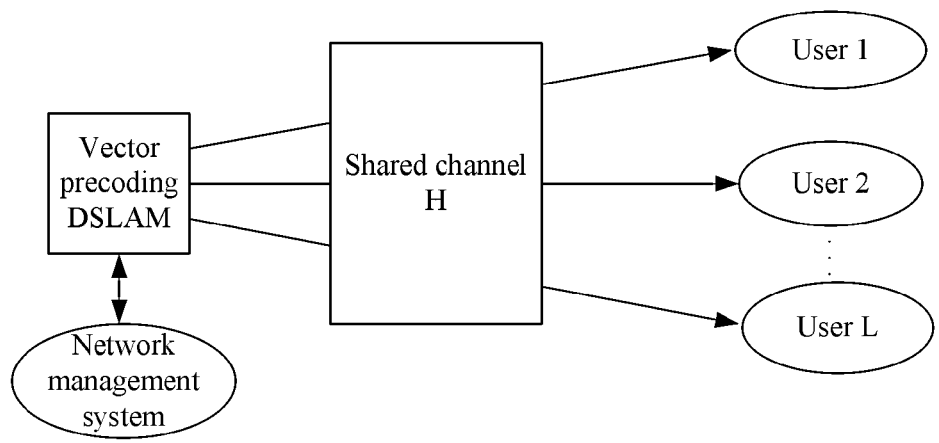
FIG. 3 is a schematic diagram of joint sending on a DSLAM side and separate receiving on a user side.
Figure 4:
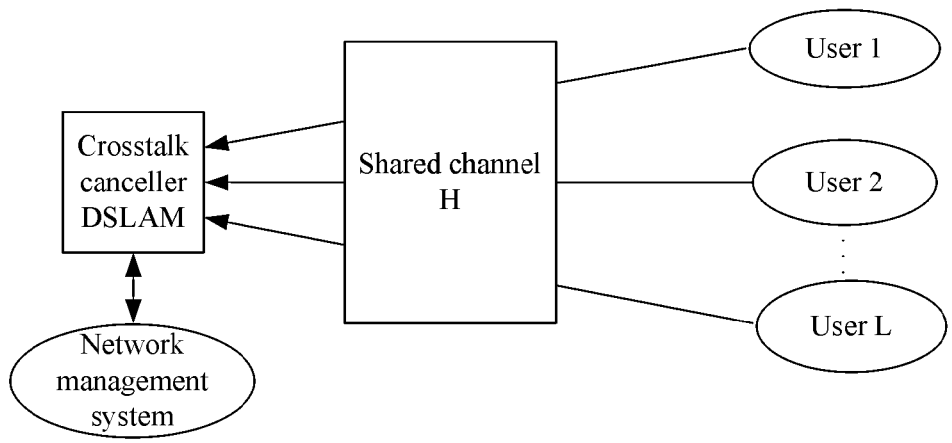
FIG. 4 is a schematic diagram of joint receiving on a DSLAM side and separate sending on a user side.
Figure 5:
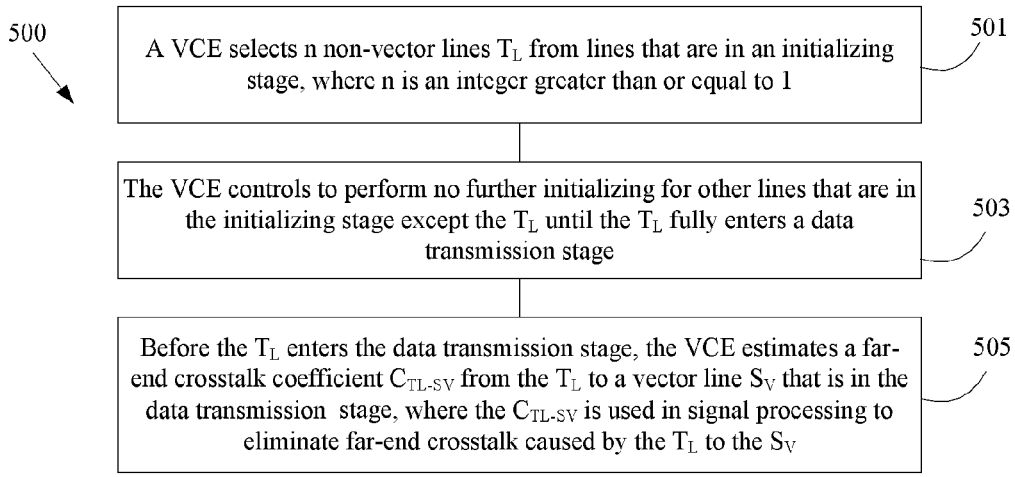
FIG. 5 is a schematic diagram of flowchart of supporting a non-vector line according to an embodiment of the present invention.

An embodiment of the present invention provides a method for supporting a vector line, as shown by 500 in FIG. 5, including:

501. A VCE selects n non-vector lines $T_L$ from lines that are in an initializing stage, where n is an integer greater than or equal to 1.

503. The VCE controls to perform no further initializing for other lines that are in the initializing stage except the $T_L$ until the $T_L$ fully enters a data transmission stage.

505. Before the $T_L$ enters the data transmission Showtime stage, the VCE estimates a far-end crosstalk coefficient $C_{TL-SV}$ from the $T_L$ to a vector line $S_V$ that is in the data transmission stage, where the $C_{TL-SV}$ is used in signal processing to eliminate far-end crosstalk caused by the $T_L$ to the $S_V$.

A person skilled in the art understands that the far-end crosstalk coefficient refers to a downlink far-end crosstalk coefficient or an uplink far-end crosstalk coefficient, or both a downlink far-end crosstalk coefficient and an uplink far-end crosstalk coefficient. For ease of description, the far-end crosstalk coefficient mentioned below refers to the above three circumstances, and readers can judge whether it denotes a downlink far-end crosstalk coefficient or an uplink far-end crosstalk coefficient, or both a downlink far-end crosstalk coefficient and an uplink far-end crosstalk coefficient according to the context.

In 503, the VCE controls to perform no further initializing for other lines that are in the initializing stage except the $T_L$. If other lines include non-vector lines, the VCE may control the VTU-O not to send a handshake signal to the non-vector lines; or, control the VTU-O to prevent the non-vector lines in other lines from entering a channel discovery stage or staying in the channel discovery stage; if other lines include vector lines, the VCE may control the VTU-O not to send a handshake signal to other vector lines that are in the initializing stage; or, control the VTU-O corresponding to other vector lines that are in the initializing stage, so as to prevent other vector lines in the initializing stage from entering the channel discovery stage or staying in the channel discovery stage. For the $T_L$ line, the VCE may control the VTU-O to send a handshake signal to the $T_L$ line, or make the $T_L$ enter the channel discovery stage or stay in the channel discovery stage, so as to continue with the $T_L$ line initializing process.

The $T_L$ should include a proper number of lines, that is, n should be set to a proper value, to ensure that, before all lines in the $T_L$ enter the Showtime, a vector line can send enough Sync Symbols and search for the corresponding Error Samples to estimate the far-end crosstalk coefficient from lines in a subset T to the vector line. The enough Sync Symbols may be 4 to 5 Sync Symbols. In theory, the Error Samples of 4 to 5 Sync Symbols are enough for estimating the cancellation coefficient from the 4 to 5 lines to other vector lines that are in the Showtime stage. In view of the impact caused by noise onto accuracy of the estimated value of the cancellation coefficient, the proper number of lines in the $T_L$ may be 1 to 5 so as to ensure accuracy of the estimated value of the cancellation coefficient. If the non-vector lines are initialized one by one, in theory, the vector line needs to send only one Sync Symbol, which is enough for estimating the far-end crosstalk coefficient from the current separately initialized line to the vector line.

Further, the far-end crosstalk coefficient $C_{TL-SV}$ from the $T_L$ to the vector line $S_V$ that is in the data transmission stage may be estimated in only the channel discovery stage of the $T_L$ initializing process; or, the far-end crosstalk coefficient $C_{TL-SV}$ from the $T_L$ to the vector line $S_V$ that is in the data transmission stage may be estimated twice in the channel discovery stage and the training stage respectively of the $T_L$ initializing process. The downlink far-end crosstalk coefficient from the $T_L$ to the $S_V$ may be estimated in an O-P-Channel-Discovery 1 stage of the Channel Discovery stage, and the uplink far-end crosstalk coefficient from the $T_L$ to the $S_V$ line may be estimated in an R-P-Channel-Discovery 1 stage. The downlink far-end crosstalk coefficient from the $T_L$ to the $S_V$ may also be re-estimated in an O-P-Training 1 stage, and the uplink far-end crosstalk coefficient from the $T_L$ to the $S_V$ line may be estimated in an R-P-Training 1 stage.

Figure 14:
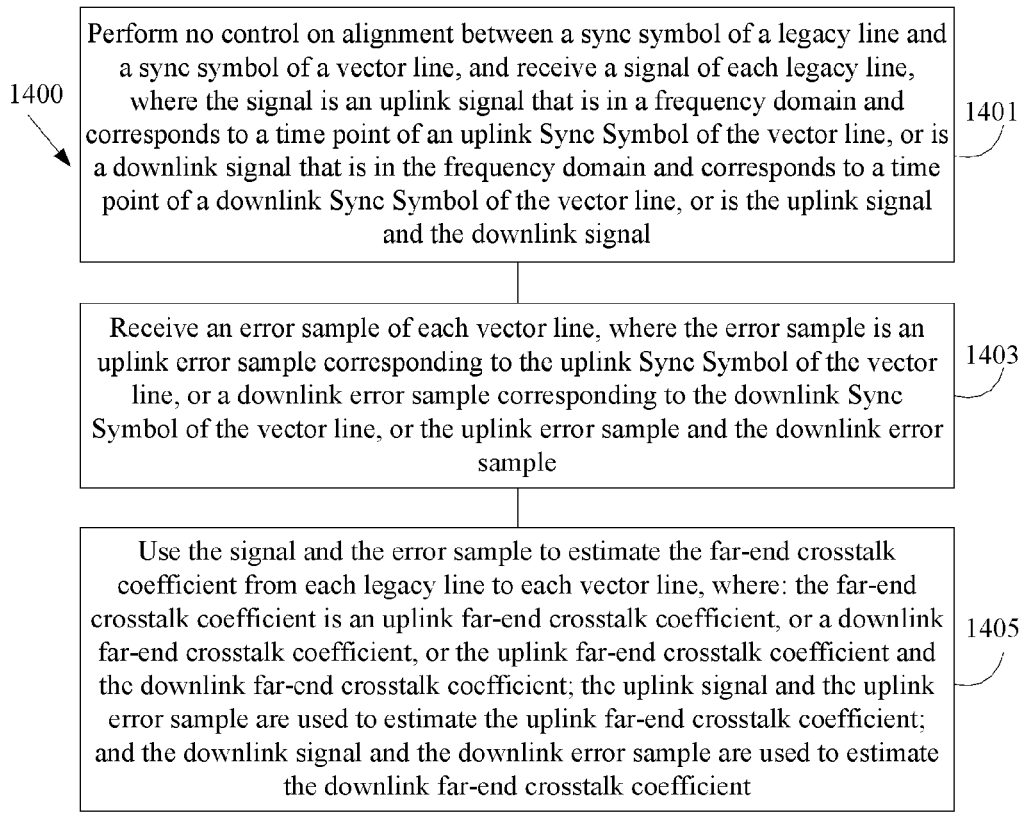
FIG. 14 is a schematic diagram of flowchart of estimating a far-end crosstalk coefficient from a non-vector line to a vector line according to an embodiment of the present invention.

Further, in estimating a far-end crosstalk coefficient $C_{TL-SV}$ from the $T_L$ to a vector line $S_V$ that is in the data transmission stage, the method shown in FIG. 14 may be applied, including: performing no control on alignment between a sync symbol of the non-vector line and a sync symbol of the vector line, and receiving a frequency domain signal existent on the $T_L$ and corresponding to a time point of the sync symbol of the vector line, where the signal is obtained when no control is performed on whether the sync symbol of the non-vector line is aligned with the sync symbol of the vector line; receiving an error sample of the sync symbol of the $S_V$, where the error sample corresponds to the signal; and using the signal and the error sample to calculate the $C_{TL-SV}$, where the $S_V$ may be all or part of the vector lines in the data transmission stage.

As can be seen from the above embodiment, some non-vector lines are selected for initializing, and no further initializing is performed for other lines in the process of initializing the selected non-vector lines, thereby controlling orderly initializing of legacy lines in an orderly manner. In addition, the interference caused by initializing of other lines to the initializing of the selected line is reduced, and better estimation results are obtained in estimating the far-end crosstalk coefficient. By using the crosstalk cancellation coefficient from the non-vector line to the vector line estimated in the initializing process, the far-end crosstalk caused by the non-vector line to the vector line is eliminated to the utmost, thereby reducing vector-DSL system instability caused by the legacy lines to the utmost, and realizing support for compatibility with the legacy non-vector lines.

Figure 6:
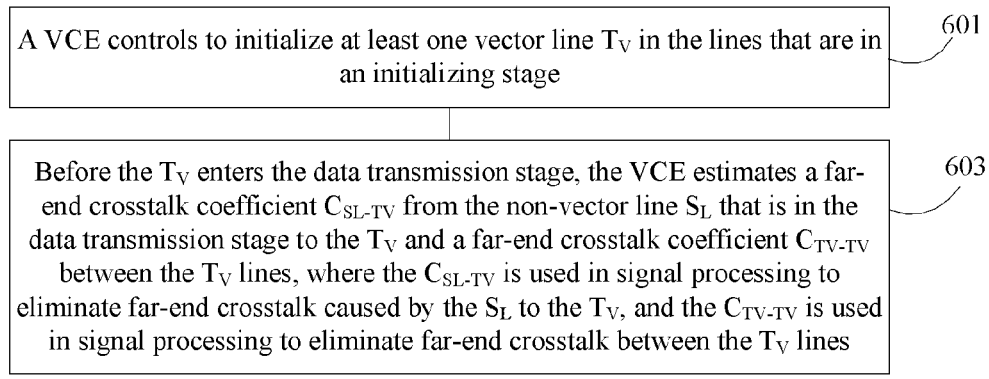
FIG. 6 is a schematic diagram of flowchart of supporting a non-vector line according to an embodiment of the present invention.

The method for supporting a non-vector line may further include steps in FIG. 6, including:

601. The VCE controls to initialize at least one vector line $T_V$ in the lines that are in the initializing stage. The $T_V$ may be all or part of the vector lines that are currently in the initializing stage.

603. Before the $T_V$ enters the data transmission stage, the VCE estimates a far-end crosstalk coefficient $C_{SL-TV}$ from the non-vector line $S_L$ that is in the data transmission stage to the $T_V$ and a far-end crosstalk coefficient $C_{TV-TV}$ between the lines Tv, where the $C_{SL-TV}$ is used in signal processing to eliminate far-end crosstalk caused by the $S_L$ to the $T_V$, and the $C_{TV-TV}$ is used in signal processing to eliminate far-end crosstalk between the lines Tv.

The foregoing steps may be performed before or after the steps shown in FIG. 5.

Further, the estimating, by the VCE, a far-end crosstalk coefficient $C_{SL-TV}$ from the non-vector line $S_L$ that is currently in the data transmission stage to the $T_V$ and a far-end crosstalk coefficient $C_{TV-TV}$ between the lines Tv in 603, may be performed in the training stage of the $T_V$ initializing process. The downlink crosstalk cancellation coefficient from the $S_L$ to the $T_V$ and the downlink crosstalk cancellation coefficient between the lines Tv may be estimated in the O-P-VECTOR 2-1 stage, and the uplink crosstalk cancellation coefficient from the $S_L$ to the $T_V$ and the uplink crosstalk cancellation coefficient between the lines Tv may be estimated in the R-P-VECTOR 2 stage.

Further, when the VCE estimates the far-end crosstalk coefficient $C_{TV-TV}$ between the lines Tv in 603, the VCE may estimate the downlink crosstalk cancellation coefficient between the lines Tv in the O-P-VECTOR 2-1 stage; estimate the uplink crosstalk cancellation coefficient between the lines Tv in the R-P-VECTOR 1 stage, re-estimate the uplink crosstalk cancellation coefficient between the lines Tv in the R-P-VECTOR 1-1 stage, and re-estimate the uplink crosstalk cancellation coefficient between the lines Tv in the R-P-VECTOR 1-2 stage; and estimate or re-estimate the uplink crosstalk cancellation coefficient between the lines Tv in the R-P-VECTOR 2 stage.

Further, the method shown in FIG. 14 may be applied in estimating the far-end crosstalk coefficient $C_{SL-TV}$ from the $S_L$ to the $T_V$ in 603, including: performing no control on whether a sync symbol of the non-vector line is aligned with a sync symbol of the vector line, receiving a frequency domain signal existent on the $S_L$ and corresponding to a time point of the sync symbol of the vector line; receiving an error sample of the sync symbol of the $T_V$; and using the signal and the error sample to calculate the $C_{SL-TV}$.

As can be seen from the above embodiment, by sequentially initializing the vector lines and the non-vector lines, newly joining in lines are controlled to undergo the initializing process in an orderly manner. In addition, by estimating the far-end crosstalk coefficient from the non-vector line that is in the data transmission stage to the vector line in the process of initializing the vector line, and using the estimated far-end crosstalk coefficient to eliminate the far end crosstalk, the far-end crosstalk caused by the non-vector line to the vector line is eliminated to the utmost, thereby reducing vector-DSL system instability caused by the legacy lines to the utmost, and realizing support for compatibility with the legacy non-vector lines.

Figure 7:
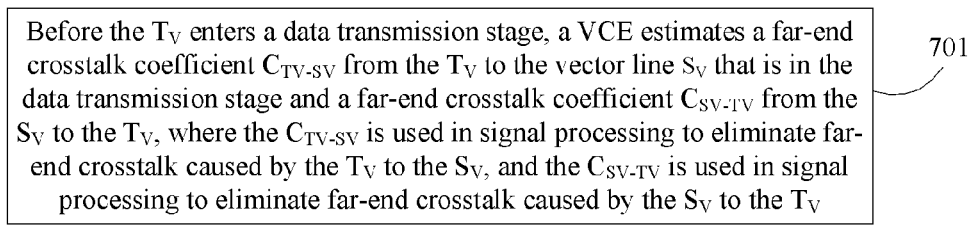
FIG. 7 is a schematic diagram of flowchart of supporting a non-vector line according to an embodiment of the present invention.

Further, considering the impact caused by the vector line $S_V$ that is in the data transmission stage, the method for supporting a non-vector line may further include the steps shown in FIG. 7:

701. Before the $T_V$ enters the data transmission stage, the VCE estimates a far-end crosstalk coefficient $C_{TV-SV}$ from the $T_V$ to the vector line $S_V$ that is in the data transmission stage and a far-end crosstalk coefficient $C_{SV-TV}$ from the $S_V$ to the $T_V$, where the $C_{TV-SV}$ is used in signal processing to eliminate far-end crosstalk caused by the $T_V$ to the $S_V$, and the $C_{SV-TV}$ is used in signal processing to eliminate far-end crosstalk caused by the $S_V$ to the $T_V$.

Further, that the VCE estimates the far-end crosstalk coefficient $C_{TV-SV}$ from the $T_V$ to the vector line $S_V$ that is currently in the data transmission stage and the far-end crosstalk coefficient $C_{SV}$-$T_V$ from the $S_V$ to the $T_V$ in 701 may be that the VCE estimates the downlink crosstalk cancellation coefficient from the $T_V$ to the $S_V$ in the O-P-VECTOR 1 stage, re-estimates the downlink crosstalk cancellation coefficient from the $T_V$ to the $S_V$ in the O-P-VECTOR 1-1 stage, estimates the downlink crosstalk cancellation coefficient from the $S_V$ to the $T_V$ in the O-P-VECTOR 2-1 stage, estimates the uplink crosstalk cancellation coefficient from the $T_V$ to the $S_V$ and can estimate the uplink crosstalk cancellation coefficient from the $S_V$ to the $T_V$ line in the R-P-VECTOR 1 stage, re-estimates the uplink crosstalk cancellation coefficient from the $T_V$ to the $S_V$ and can re-estimate the uplink crosstalk cancellation coefficient from the $S_V$ to the $T_V$ line in the R-P-VECTOR 1-1 stage, re-estimates the uplink crosstalk cancellation coefficient from the $T_V$ to the $S_V$ and can re-estimate the uplink crosstalk cancellation coefficient from the $S_V$ to the $T_V$ line in the R-P-VECTOR 1-2 stage, and estimates or re-estimates the uplink crosstalk cancellation coefficient from the $S_V$ to the $T_V$ line in R-P-VECTOR 2.

Figure 8:
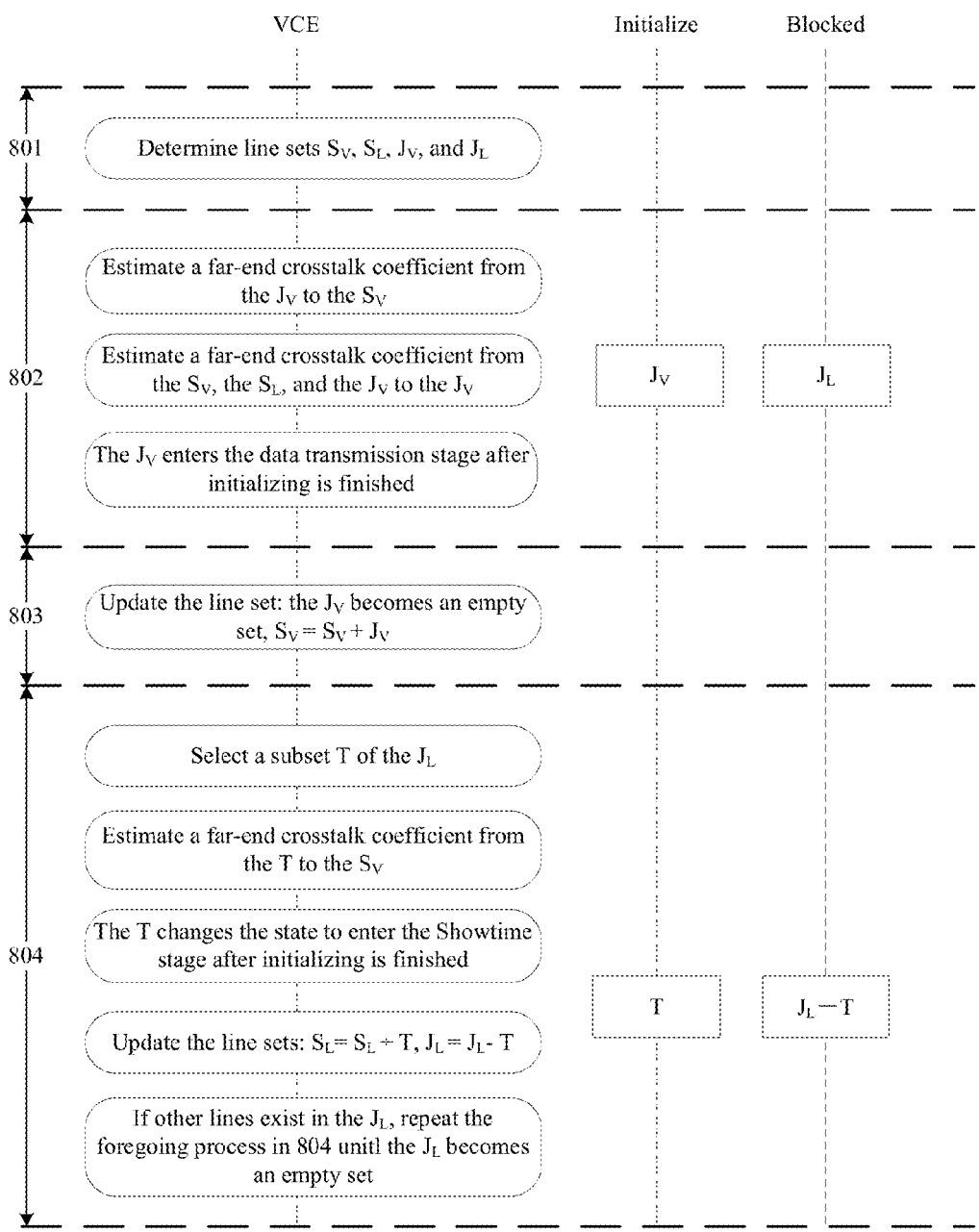
FIG. 8 is a schematic diagram of processing of supporting a non-vector line according to an embodiment of the present invention.

FIG. 8 shows an example of supporting a non-vector line according to an embodiment of the present invention, including the following steps:

801. The VCE determines line sets $S_V$, $S_L$, $J_V$, and $J_L$.

At a specific time point, each line set in each stage may be determined first. Each of the four sets may be empty, but at least one of $J_V$ and $J_L$ is not empty. In the example in FIG. 8, it is assumed that none of the four sets is empty. According to this embodiment, a person skilled in the art can easily obtain the processing procedure in the case that one set or certain sets are empty. In this embodiment, it is assumed that after the $S_V$, the $S_L$, the $J_V$, and the $J_L$ are determined in 801 and before the initializing of all lines in the $J_L$ is finished in 804, no new line joins in within the period. In the Handshake stage, the VTU-R interacts with the VTU-O to know whether their capabilities support vector CPEs or legacy CPEs. Therefore, before the Handshake stage, the VCE does not know whether the CPE connected thereto is a vector CPE, and in the Handshake stage, the VCE knows the type of the CPE through the VTU-O, and therefore, knows the type of the line.

802. The VCE controls the VTU-O connected to the $J_V$ to continue initializing the $J_V$. After initializing of the $J_V$ is finished and before the $J_V$ enters the Showtime stage, the VCE estimates the far-end crosstalk coefficient from the $J_V$ to the $S_V$, the far-end crosstalk coefficient from the $S_V$ to the $J_V$, the far-end crosstalk coefficient from the $S_L$ to the $J_V$, and the far-end crosstalk coefficient from the $J_V$ to the $J_V$, that is, the far-end crosstalk coefficient between the $J_V$ lines. The $J_V$ enters the data transmission stage after initializing is finished.

In the period after the initializing is continued for the $J_V$ and before the $J_V$ enters the Showtime stage, the VTU-O connected to the $J_L$ is controlled to obstruct initializing of the $J_L$ line, that is, to perform no further initializing for the $J_L$ line. If the $S_L$ is empty, the far-end crosstalk coefficient from the $S_L$ to the $J_V$ does not need to be estimated.

803. Update the line set $S_V$ to a union set of the original $S_V$ and $J_V$. At this time, the $J_V$ becomes an empty set.

804. The VCE controls the VTU-O connected to the $J_L$ to continue initializing the lines in the $J_L$. A subset T of the $J_L$ may be selected, and further initializing for the T is performed under control. Before the T enters the Showtime stage, the far-end crosstalk coefficient from the T to the $S_V$ is estimated, and the T changes the state to enter the Showtime stage after initializing is finished. In the period after the initializing is continued for the T and before the T enters the Showtime, other lines in the $J_L$ are obstructed, that is, no further initializing is performed for other lines in the $J_L$ until the T fully enters the Showtime stage. After initializing of the T is finished, the line set $S_L$ is updated to a union set of the $S_L$ and the T determined in 801, and the line set $J_L$ is updated to a set with the T removed from the original $J_L$. If other lines still exist in the $J_L$, the foregoing process in this step is repeated until the $J_L$ becomes an empty set.

To ensure the effect of initializing, the subset T selected each time should include a proper number of lines, and preferably, include 1 to 5 lines.

In 802, the far-end crosstalk coefficient from the $J_V$ line to the $S_V$ line may be estimated first, and then other far-end crosstalk coefficients are estimated, so as to prevent the $S_V$ from bit errors or other errors or even line interruption due to $J_V$ crosstalk.

In estimating the far-end crosstalk coefficient from the non-vector line to the vector line in 804, algorithms such as a least mean square error LMS algorithm, a matrix first-order likelihood algorithm, or a matrix inversion algorithm may be applied.

The following describes specific application of the estimated far-end crosstalk coefficient by using the scenario of supporting a non-vector line in FIG. 8 as an example. After the far-end crosstalk coefficient from the $J_V$ line to the $S_V$ line is estimated in 802, the $S_V$ line can enable a downlink precoder and/or an uplink canceller from the $J_V$ line to the $S_V$ line.

For the downlink direction, the following precoding may be performed:

$$\tilde{x}_{VS} = P_{VS\text{-}VS} x_{VS} + P_{LS\text{-}VS} x_{LS} + P_{VJ\text{-}VS} x_{VJ}$$

where $P_{VS\text{-}VS}$ is an existing downlink far-end crosstalk coefficient between the $S_V$ lines, $x_{VS}$ is an $S_V$ line signal input into the precoder, $P_{LS\text{-}VS}$ is an existing downlink far-end crosstalk coefficient from the $S_L$ line to the $S_V$ line, $x_{LS}$ is an $S_L$ line signal input into the precoder, $P_{VJ\text{-}VS}$ is a downlink far-end crosstalk coefficient from the $J_V$ line to the $S_V$ line as estimated in 802, $x_{VJ}$ is a $J_V$ line signal input into the precoder, and $x_{VS}$ is a signal output by the precoder after the $S_V$ line signal passes through the precoder.

For the uplink direction, the following uplink crosstalk cancellation may be performed:

$$\tilde{y}_{VS} = W_{VS\text{-}VS} y_{VS} + W_{LS\text{-}VS} y_{LS} + W_{VJ\text{-}VS} y_{VJ}$$

where $W_{VS\text{-}VS}$ is an existing uplink far-end crosstalk coefficient between the $S_V$ lines, $y_{VS}$ is an $S_V$ line signal input into the canceller, $W_{LS\text{-}VS}$ is an existing uplink far-end crosstalk coefficient from the $S_L$ line to the $S_V$ line, $y_{LS}$ is an $S_L$ line signal input into the canceller, $W_{VJ\text{-}VS}$ is an uplink far-end crosstalk coefficient from the $J_V$ line to the $S_V$ line as estimated in 802, $y_{VJ}$ is a $J_V$ line signal input into the canceller, and $\tilde{y}_{VS}$ is a signal output by the canceller after the $S_V$ line signal passes through the canceller.

After the far-end crosstalk coefficient from the $S_V$ line and the $J_V$ line to the $J_V$ line and the cancellation coefficient from the $S_L$ line to the $J_V$ line are estimated in 802, the $J_V$ line enables downlink precoders and/or uplink cancellers from the $S_V$ line to the $J_V$ line, from the $J_V$ line to the $J_V$ line, and from the $S_L$ line to the $J_V$ line.

For the downlink direction, the following precoding may be performed:

$$\tilde{x}_{VJ} = P_{VS\text{-}VJ} x_{VS} + P_{LS\text{-}VJ} x_{LS} + P_{VJ\text{-}VJ} x_{VJ}$$

where $P_{VS\text{-}VJ}$ is a downlink far-end crosstalk coefficient from the $S_V$ line to the $J_V$ line as estimated in 802, $x_{VS}$ is an $S_V$ line signal input into the precoder, $P_{LS\text{-}VJ}$ is a downlink far-end crosstalk coefficient from the $S_L$ line to the $J_V$ line as estimated in 802, $x_{LS}$ is an $S_L$ line signal input into the precoder, $P_{VJ\text{-}VJ}$ is a downlink far-end crosstalk coefficient from the $J_V$ line to the $J_V$ line as estimated in 802, $x_{VJ}$ is a $J_V$ line signal input into the precoder, and $\tilde{x}_{VJ}$ is a signal output by the precoder after the $J_V$ line signal passes through the precoder.

For the uplink direction, the following crosstalk cancellation may be performed:

$$\tilde{y}_{VJ} = W_{VS\text{-}VJ} y_{VS} + W_{LS\text{-}VJ} y_{LS} + W_{VJ\text{-}VJ} y_{VJ}$$

where $W_{VS\text{-}VJ}$ is an uplink far-end crosstalk coefficient from the $S_V$ line to the $J_V$ line as estimated in 802, $y_{VS}$ is an $S_V$ line signal input into the canceller, $W_{LS\text{-}VJ}$ is an uplink far-end crosstalk coefficient from the $S_L$ line to the $J_V$ line as estimated in 802, $Y_{LS}$ is an $S_L$ line signal input into the canceller, $W_{VJ\text{-}VJ}$ is an uplink far-end crosstalk coefficient from the $J_V$ line to the $J_V$ line as estimated in 802, $y_{VJ}$ is a $J_V$ line signal input into the canceller, and $\tilde{y}_{VJ}$ is a signal output by the canceller after the $J_V$ line signal passes through the canceller.

After the far-end crosstalk coefficient from the line in the subset T to the line in the V is estimated in 804, the line in the V enables a precoder and/or an uplink crosstalk canceller from the line in the T to the line in the V. For the downlink direction, the applied precoder is as follows:

$$\tilde{x}_V = P_{V\text{-}V} x_V + P_{LS\text{-}V} x_{LS} + P_{T\text{-}V} x_T$$

where $P_{V\text{-}V}$ is a downlink far-end crosstalk coefficient between the V lines, and may be obtained according to the existing $P_{VS\text{-}VS}$ and the estimated $P_{VS\text{-}VJ}$, $P_{VJ\text{-}VS}$, and $P_{VJ\text{-}VJ}$; $P_{LS\text{-}V}$ is a downlink far-end crosstalk coefficient from the $S_L$ line to the V line, and is obtained according to the existing $P_{LS\text{-}VS}$ and the estimated $P_{LS\text{-}VJ}$; $P_{T\text{-}V}$ is a downlink far-end crosstalk coefficient from the T line to the V line as estimated in 804; $x_V$, $x_{LS}$, and $x_T$ are respectively line signals in the V, the $S_L$, and the T input in the precoder; and $\tilde{x}_V$ is a signal output by the precoder after the V line signal passes through the precoder.

For the uplink direction, the following crosstalk cancellation may be performed:

$$\tilde{y}_V = W_{V\text{-}V} y_V + W_{LS\text{-}V} y_{LS} + W_{T\text{-}V} y_T$$

where $W_{V\text{-}V}$ is an uplink far-end crosstalk coefficient between the V lines, and may be obtained according to the existing $W_{VS\text{-}VS}$ and the estimated $W_{VJ\text{-}VJ}$, $W_{VS\text{-}VJ}$, and $W_{VJ\text{-}VS}$; $W_{LS\text{-}V}$ is an uplink far-end crosstalk coefficient from the $S_L$ line to the V line, and may be obtained according to the existing $W_{LS\text{-}VS}$ and the estimated $W_{LS\text{-}VJ}$; $W_{T\text{-}V}$ is an uplink far-end crosstalk coefficient from the T line to the V line as estimated in 803; $y_V$, $y_{LS}$, and $y_T$ are respectively line signals in the V, the $S_L$, and the T input in the canceller; and $\tilde{y}_V$ is a signal output by the canceller after the V line signal passes through the canceller.

In 802, an LMS algorithm is used to estimate the far-end crosstalk coefficient from the $S_V$, the $S_L$, and the $J_V$ to the $J_V$; or, based on errors in multiple occasions of vector line feedback, a formula in the form of the following matrix is applied, where each column in X and E represents one occasion of sending a signal and the corresponding error:

$$E_{VJ} = H_{VS\text{-}VJ} X_{VS} + H_{VJ\text{-}VJ} X_{VJ} + H_{LJ\text{-}VJ} X_{LJ} + N_{VJ}.$$

Noticeably, the $E_{VJ}$, the $X_{VS}$, the $X_{VJ}$, and the $X_{LJ}$ are known and the $N_{VJ}$ is very small, maximum likelihood estimation or a least-square method may be applied to estimate the far-end crosstalk cancellation coefficient from the $S_V$, the $S_L$, and the $J_V$ to the $J_V$; or another algorithm is applied to the estimation.

In 804, an LMS algorithm is used to estimate the cancellation coefficient from the T to the $S_V$; or, based on errors in multiple occasions of vector line feedback, a formula in the form of the following matrix is applied, where each column in X and E represents one occasion of sending a signal and the corresponding error:

$$E_{VS} = H_{VS\text{-}VS} P_{VS\text{-}VS} X_{VS} + H_{LS\text{-}VS} P_{LS\text{-}VS} X_{LS} + H_{T\text{-}VS} X_T + N_{VS}.$$

Similarly, the $E_{LS}$, the $X_{VS}$, the $X_{LS}$, and the $X_T$ are known and the $N_{LS}$ is very small, maximum likelihood estimation or a least-square method may be applied to estimate the cancellation coefficient from the T to the $S_V$; or another algorithm is applied to the estimation.

When the foregoing method is applied, a good crosstalk cancellation coefficient from the legacy line to the vector line can be obtained even if the Sync Symbol of the legacy line is not aligned with the Sync Symbol of the vector line; and, when the Sync Symbol of some legacy lines is aligned with the Sync Symbol of the vector lines, second best crosstalk cancellation coefficients from the legacy line to the vector line can also be obtained.

The VCE can implement a state machine to control initializing for new lines to support non-vector lines. The lines in the Showtime stage at any time constitute a set S, and new lines that are currently in the Initializing stage constitute a set J, where S includes a vector line set $S_V$ and a legacy line set $S_L$, and J includes a vector line set $J_V$ and a legacy line set $J_L$. The VCE may perform state transition in a way shown in FIG. 9:

When the VCE is in the S1 state, the VCE updates the current state of the J regularly or irregularly, and performs state transition according to the state of the J: if the J is an empty set, that is, no line currently joins in and waits for getting online, the S1 state remains; if the $J_V$ is not an empty set, that is, the J includes a vector line, the state changes to the S2 state; if the $J_V$ is an empty set and the $J_L$ is not an empty set, that is, the J includes only legacy lines, the state changes to the S3 state.

As can be seen from the foregoing judgment for state transition, in the processing of the state machine, when a vector line and a legacy line that are in the Initializing state coexist, the vector line is initialized first.

When the VCE is in the S2 state, the vector line in the Initializing stage is initialized. In the initializing process, a new line may join in and need to be initialized. State transition may be performed according to the state of the J in the current system each time after initializing of at least one vector line is finished: if the J is an empty set, the state changes to the S1 state; if the $J_V$ is not an empty set, the S2 state remains; and, if the $J_V$ is an empty set and the $J_L$ is not an empty set, the state changes to the S3 state.

When the VCE is in the S3 state, the legacy line in the Initializing stage is initialized. In the initializing process, a new line may join in and need to be initialized. State transition may be performed according to the state of the J in the current system each time after initializing of at least one legacy line is finished: if the J is an empty set, the state changes to the S1 state; if the $J_V$ is not an empty set, the state changes to the S2 state; and, if the $J_V$ is an empty set and the $J_L$ is not an empty set, the S3 state remains.

Figure 9:
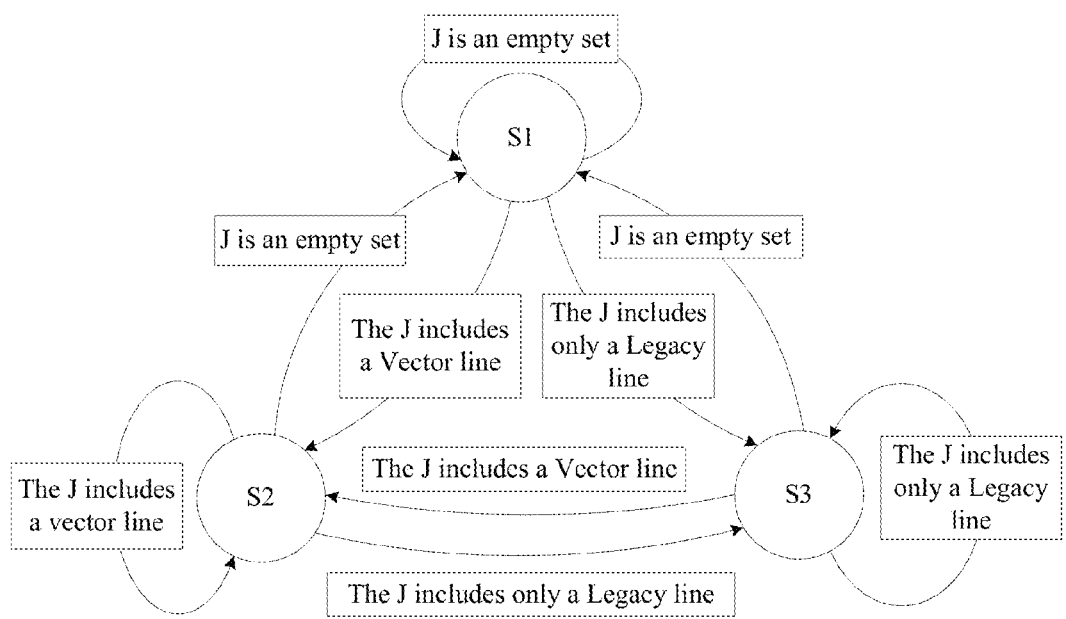
FIG. 9 is a schematic diagram of state change in supporting a non-vector line according to an embodiment of the present invention.

The following describes the state machine in FIG. 9 with reference to a specific example:

After the system starts running, at the t0 time, no line joins in, and the state machine runs in the S1 state; and, at the t1 time, if a new line joins in, the value of the $J_V$ changes to $J_{V1}$, and the value of the $J_L$ changes to $J_{L1}$, and therefore, the state changes to S2.

In the S2 state, the VTU-O corresponding to the $J_{V1}$ lines may be controlled so that the $J_{V1}$ lines continue the initializing process simultaneously or consecutively. Here it is assumed that the initializing process is continued simultaneously. After initializing is finished, all $J_{V1}$ lines enter the Showtime stage. For the $J_{L1}$ lines, in the period after the initializing process is continued for the $J_{V1}$ lines simultaneously and before all $J_{V1}$ lines enter the Showtime stage, the VTU-O corresponding to the $J_{L1}$ lines is controlled to obstruct the initializing process of the $J_{L1}$ lines.

If a vector line $S_{V1}$ in the Showtime stage already exists in the system at the t1 time, in the process of initializing the $J_{V1}$, the far-end crosstalk coefficient $C_{JV1\text{-}SV1}$ from the $J_{V1}$ to the vector line $S_{V1}$ that is currently in the data transmission stage, the far-end crosstalk coefficient $C_{SV1\text{-}JV1}$ from the $S_{V1}$ to the $J_{V1}$, and the far-end crosstalk coefficient $C_{JV1\text{-}JV1}$ between the $J_{V1}$ lines may be estimated. The $J_{V1}$ enters the data transmission stage after initializing is finished. The $C_{JV1\text{-}SV1}$ is used in signal processing to eliminate the far-end crosstalk caused by the $J_{V1}$ to the $S_{V1}$, the $C_{SV1\text{-}JV1}$ is used in signal processing to eliminate the far-end crosstalk caused by the $S_{V1}$ to the $J_{V1}$, and the $C_{JV1\text{-}JV1}$ is used in signal processing to eliminate the far-end crosstalk between the $J_{V1}$ lines.

If a non-vector line $S_{L1}$ in the Showtime stage already exists in the system at the t1 time, in the process of initializing the $J_{V1}$, the far-end crosstalk coefficient $C_{SL1\text{-}JV1}$ from the $S_{L1}$ to the $J_{V1}$ can be estimated in the process of initializing the $J_{V1}$, where the $C_{SL1\text{-}JV1}$ is used in signal processing to eliminate the far-end crosstalk caused by the $S_L$ to the $J_V$.

In the process of initializing the $J_{V1}$, no other lines are initialized. Therefore, the vector lines and the legacy lines in the Showtime stage in the system do not change until initializing of the $J_{V1}$ lines is finished and the $J_{V1}$ lines enter the Showtime stage.

After initializing of the $J_{V1}$ lines is finished and the $J_{V1}$ lines enter the Showtime stage, as against the t1 time, at the t2 time, the $J_{V1}$ lines need to be removed from the vector lines that are in the Initializing stage, and the $J_{V1}$ lines join in the vector lines that are in the Showtime stage, that is, the $S_{V2}$ at the t2 time is a union set of the $S_{V1}$ and the $J_{V1}$. If no new vector line joins in but any new legacy line joins in within the period from t1 to t2, the $J_{V2}$ is an empty set but the $J_{L2}$ is not an empty set, and the state needs to change to S3.

In the S3 state, the VCE may select a group of lines T randomly from the $J_{L2}$ to perform further initializing, where the T needs to include a proper number of lines. Preferably, 1 or 2 lines may be selected for further initializing. In the period from the start of further initializing of the T to the T fully entering the Showtime stage, it is not allowed to initialize other lines. Control is exercised to perform no further initializing for other lines that are in the initializing state except the T until the T fully enters the Showtime stage. The far-end crosstalk coefficient $C_{T-SV2}$ from the T to $S_{V2}$ may be estimated before the T enters the Showtime stage, where the $C_{T-SV2}$ is used in signal processing to eliminate the far-end crosstalk caused by the T to the $S_{V2}$. If the number of lines in the $J_{L2}$ is greater than the number of lines in the T, in the process of further initializing the T, the VCE controls the VTU-O corresponding to the lines unattributed to the T in the $J_{L2}$ to obstruct further initializing of the Legacy lines, and additionally, controls the VTU-O corresponding to the T lines to make the current T lines continue the initializing process simultaneously. However, the line initializing may fail. The line that fails in initializing may stay in the Initializing state and re-initiate the initializing at proper time. To make the description brief, this embodiment assumes that all lines can be initialized successfully. A person skilled in the art can know how to handle the scenario of initializing failure according to this embodiment.

In the process of initializing the T, no initializing of other lines is finished. Therefore, the vector lines and the Legacy lines in the Showtime stage in the system do not change until initializing of the T lines is finished and the T lines enter the Showtime stage.

After the T lines enter the Showtime stage, as against the t2 time, at the t3 time, with the T removed from the non-vector lines that are in the Initializing stage, the non-vector lines that are in the Initializing stage change to $J_{L3}$; and, with the T added to the non-vector lines that are in the Showtime stage, the non-vector lines that are in the Showtime stage change to $S_{L3}$. If all $J_{L2}$ lines enter the Showtime stage at the t3 time and no new line joins in between t2 and t3, that is, the $J_{L3}$ is an empty set and the $J_{V3}$ is an empty set, the state changes to the S1 state; if any lines exist in the $J_{L3}$ and the $J_{V3}$ is an empty set, then according to the procedure described above, a group of lines T that are in the Join In stage are selected to be further initialized, and the state remains at S3; and, if a new line exists and the $J_{V3}$ is not an empty set, the state changes to the S2 state.

Figure 10:
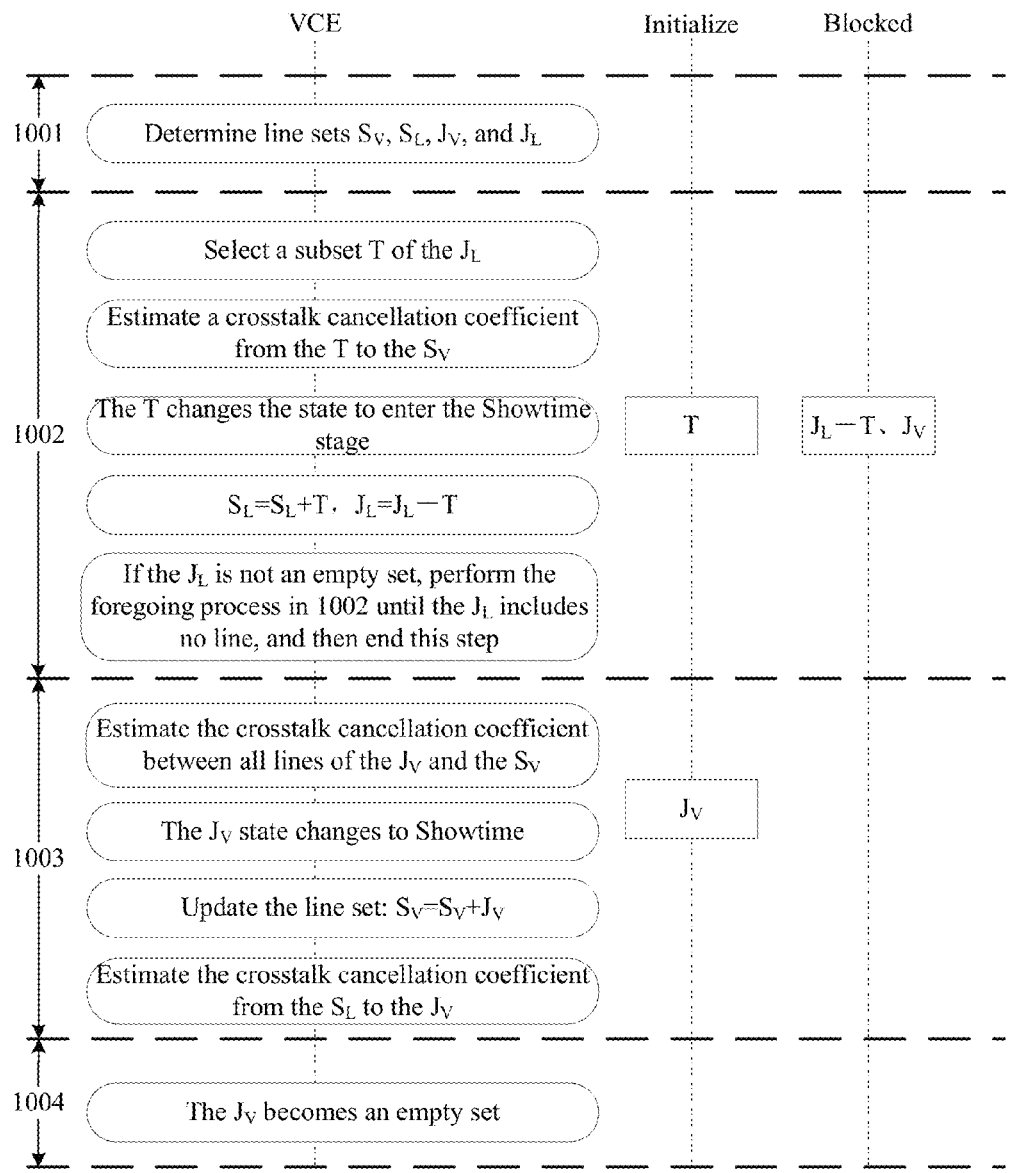
FIG. 10 is a schematic diagram of processing of supporting a non-vector line according to an embodiment of the present invention.

As shown in FIG. 10, another example of supporting a non-vector line according to an embodiment of the present invention includes the following steps:

1001. The VCE determines the line sets $S_V$, $S_L$, $J_V$, and $J_L$ at the current time.

At a specific time point, each line set in each stage may be determined first. Each of the four sets may be empty, but at least one of $J_V$ and $J_L$ is not empty. In the example in FIG. 10, it is assumed that none of the four sets is empty. According to this embodiment, a person skilled in the art can easily obtain the processing procedure in the case that one set or certain sets are empty. In this embodiment, it is assumed that after the $S_V$, the $S_L$, the $J_V$, and the $J_L$ are determined in 1001 and before the initializing of all lines in the $J_L$ is finished in 1004, no new line joins in and waits for initializing within the period.

1002. Continue initializing the lines in the $J_L$. A subset T of the $J_L$ may be selected, and further initializing for the T is performed under control. Before the T enters the Showtime stage, the far-end crosstalk coefficient from the T to the $S_V$ is estimated, and the T changes the state to enter the Showtime stage after initializing is finished. In the period after the initializing is continued for the T and before the T enters the Showtime stage, other lines in the $J_L$ are obstructed, that is, no further initializing is performed for other lines in the $J_L$ until the T fully enters the Showtime stage. After initializing of the T is finished, the line set $S_L$ is updated to a union set of the $S_L$ and the T determined in 1001, and the line set $J_L$ is updated to a set with the T removed from the original $J_L$. If other lines still exist in the $J_L$, the foregoing process in this step is repeated until the $J_L$ becomes an empty set.

To ensure the effect of initializing, the subset T selected each time should include a proper number of lines, and preferably, include 1 or 2 lines.

1003. Continue the initializing process of the $J_V$. In the process of initializing the $J_V$, estimate the far-end crosstalk coefficient from the $J_V$ to the $S_V$, the far-end crosstalk coefficient from the $S_V$ to the $J_V$, and the far-end crosstalk coefficient from the $J_V$ to the $J_V$, that is, the far-end crosstalk coefficient between the $J_V$ lines, where the $J_V$ enters the data transmission stage after initializing is finished. Update the line set, where the updated $S_V$ is a union set of the before-update $S_V$ and $J_V$. When the far-end crosstalk coefficient between the vector lines is estimated, the crosstalk from the $S_L$ line to the $J_V$ line may be treated as background noise.

1004. Estimate the far-end crosstalk coefficient from the $S_L$ to the $J_V$, and update the line set $J_V$ to an empty set.

The following describes specific application of the estimated far-end crosstalk coefficient by using the scenario of supporting a non-vector line in FIG. 10 as an example. After the far-end crosstalk coefficient from the T line to the $S_V$ line is estimated in 1002, a precoder and/or an uplink crosstalk canceller may be enabled to cancel the crosstalk from the $S_V$ line to the T line. For the downlink direction, the following precoding is applied:

$$\tilde{x}_{VS} = P_{VS-VS} x_{VS} + P_{LS-VS} x_{LS} + P_{T-VS} x_T$$

where $P_{VS-VS}$, $P_{LS-VS}$, and $P_{T-VS}$ are downlink far-end crosstalk coefficients from the $S_V$ line, the $S_L$ line, and the T line to the $S_V$ line, respectively, $P_{T-VS}$ is an estimated downlink far-end crosstalk coefficient; $x_{VS}$, $x_{LS}$, and $X_T$ are $S_V$, $S_L$, and T line signals input into the precoder, respectively; and $\tilde{x}_{VS}$ is a signal output by the precoder after the $S_V$ line signal passes through the precoder.

For the uplink direction, the crosstalk may be cancelled by using the following method:

$$\tilde{y}_{VS} = W_{VS-VS} y_{VS} + W_{LS-VS} y_{LS} + W_{T-VS} y_T$$

where $W_{VS-VS}$ is an existing uplink far-end crosstalk coefficient between the $S_V$ lines, $y_{VS}$ is an $S_V$ line signal input into the canceller, $W_{LS-VS}$ is an existing uplink far-end crosstalk coefficient from the $S_L$ line to the $S_V$ line, $y_{LS}$ is an $S_L$ line signal input into the canceller, $W_{T-VS}$ is an estimated uplink far-end crosstalk coefficient from the T to the $S_V$ line, $y_T$ is a T line signal input into the canceller, and $\tilde{y}_{VS}$ is a signal output by the canceller after the $S_V$ line signal passes through the canceller.

After the far-end crosstalk coefficients from the $J_V$ line to all $S_V$ lines are estimated in 1003, a precoder and/or an uplink crosstalk canceller may be enabled to cancel the crosstalk from the $S_V$ line to the $J_V$ line, and a precoder and/or an uplink crosstalk canceller may be enabled to cancel the crosstalk from the $J_V$ line to the $S_V$ line. In this case, the uplink and downlink cancellation of the $S_V$ line is as follows:

$$\tilde{x}_{VS} = P_{VS\text{-}VS}x_{VS} + P_{LS\text{-}VS}x_{LS} + P_{VJ\text{-}VS}x_{VJ}; \text{ and}$$

$$\tilde{y}_{VS} = W_{VS\text{-}VS}y_{VS} + W_{LS\text{-}VS}y_{LS} + W_{VJ\text{-}VS}y_{VJ}.$$

Because the far-end crosstalk coefficient from the $S_L$ line to the $J_V$ is not estimated at the moment, the uplink and downlink cancellation of the $J_V$ line is as follows:

$$\tilde{x}_{VJ} = P_{VS\text{-}VJ}x_{VS} + P_{VJ\text{-}VJ}x_{VJ}; \text{ and}$$

$$\tilde{y}_{VJ} = W_{VS\text{-}VJ}y_{VS} + W_{VJ\text{-}VJ}y_{VJ}.$$

After the far-end crosstalk coefficient from the $S_L$ line to the $J_V$ line and the far-end crosstalk coefficient from the $J_L$ line to the $J_V$ line are estimated in 1004, a precoder and/or an uplink crosstalk canceller may be enabled to cancel the crosstalk from the $J_V$ line to the $S_L$ line, and a precoder and/or an uplink crosstalk canceller may be enabled to cancel the crosstalk to the $J_L$ line. In this case, the uplink and downlink cancellation of the $J_V$ line is as follows:

$$\tilde{x}_{VJ} = P_{VS\text{-}VJ}x_{VS} + P_{LS\text{-}VJ}x_{LS} + P_{VJ\text{-}VJ}x_{VJ}; \text{ and}$$

$$\tilde{y}_{VJ} = W_{VS\text{-}VJ}y_{VS} + W_{LS\text{-}VJ}y_{LS} + W_{VJ\text{-}VJ}y_{VJ}.$$

The meanings of the parameters in the above formulas may be obtained according to the above description, and are not described here repeatedly.

The VCE can implement a state machine to control initializing for new lines to support non-vector lines. The lines in the Showtime stage at any time constitute a set S, and new lines that are currently in the Initializing stage constitute a set J, where S includes a vector line set $S_V$ and a legacy line set $S_L$, and J includes a vector line set $J_V$ and a legacy line set $J_L$. The VCE may perform state transition in a way shown in FIG. 11:

When the VCE is in the T1 state, the VCE updates the current state of the J regularly or irregularly, and performs state transition according to the state of the J: if the J is an empty set, that is, no line currently joins in and waits for getting online, the T1 state remains; if the $J_L$ is not an empty set, that is, the J includes a legacy line, the state changes to the T2 state; if the $J_L$ is an empty set and the $J_V$ is not an empty set, that is, the J includes only vector lines, the state changes to the T3 state.

It can be seen from the foregoing judgment for state transition that in the state machine, when a vector line and a legacy line that are in the Join In state coexist, the legacy line is initialized first.

When the VCE is in the T2 state, the legacy line in the Initializing stage is initialized. In the initializing process, a new line may join in and need to be initialized. State transition may be performed according to the state of the J in the current system each time after initializing of at least one legacy line is finished: if the J is an empty set, the state changes to the T1 state; if the $J_L$ is not an empty set, the T2 state remains; and, if the $J_L$ is an empty set and the $J_V$ is not an empty set, the state changes to the T3 state.

When the VCE is in the T3 state, the vector line in the Initializing stage is initialized. In the initializing process, a new line may join in and need to be initialized. State transition may be performed according to the state of the J in the current system each time after initializing of at least one vector line is finished: if the J is an empty set, the state changes to the T1 state; if the $J_L$ is not an empty set, the state changes to the T2 state; and, if the $J_L$ is an empty set and the $J_V$ is not an empty set, the T3 state remains.

Figure 11:
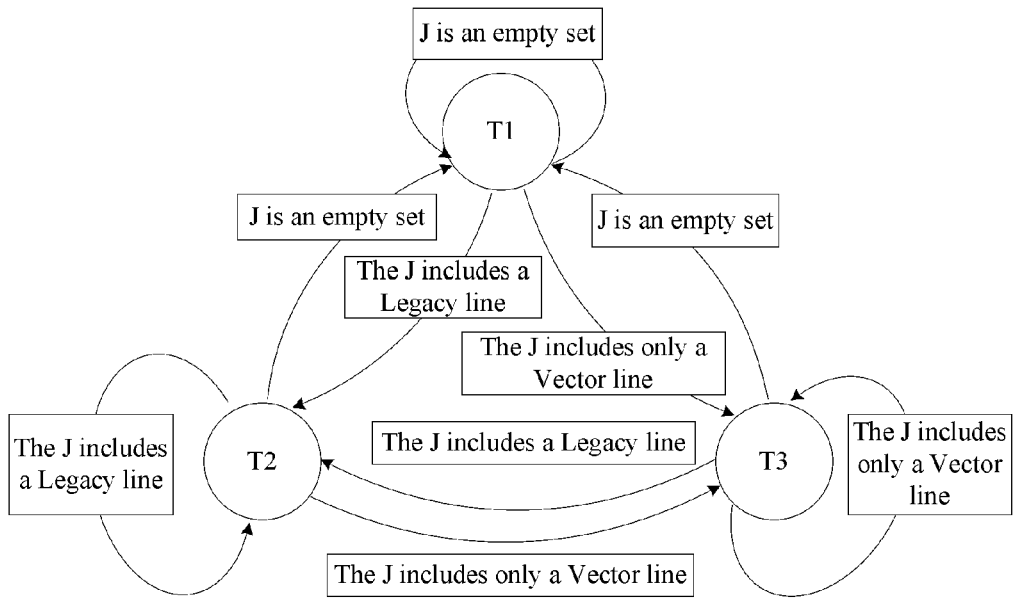
FIG. 11 is a schematic diagram of state change in supporting a non-vector line according to an embodiment of the present invention.

The following describes the state machine in FIG. 11 with reference to a specific Example After the system starts running, at the t0 time, no line joins in, and the state machine runs in the T1 state; and, at the t1 time, a new line joins in the lines that are in the Initializing stage, the value of the $J_L$ changes to $J_{L1}$, and the value of the $J_V$ changes to $J_{V1}$, and therefore, the state changes to T2. The vector line in the Showtime stage at the t1 time is $S_{V1}$.

In the T2 state, the VCE may select a group of lines T randomly from the $J_{L1}$ to perform further initializing, where the T needs to include a proper number of lines. Preferably, 1 or 2 lines may be selected for initializing. In the period after the initializing is continued for the T and before the T enters the Showtime stage, the initializing process for other lines needs to be obstructed, that is, no further initializing is performed for other lines that are already in the Initializing stage. Before the T enters the Showtime stage, the far-end crosstalk coefficient $C_{T\text{-}SV1}$ from the T to the vector line $S_{V1}$ that is currently in the Showtime stage is estimated, where the $C_{T\text{-}SV1}$ is used in signal processing to eliminate the far-end crosstalk caused by the T to the $S_{V1}$. After initializing is finished, the T enters the data transmission stage. If the number of lines in the $J_{L1}$ is greater than the number of lines in the T, in the period of initializing the T, the VCE controls the VTU-O corresponding to the lines unattributed to the T in the $J_{L1}$ to obstruct further initializing of the lines, and additionally, controls the VTU-O corresponding to the T lines to make the current T lines continue the initializing process simultaneously. In addition, in the period of initializing the T, the initializing of $J_{V1}$ lines is also obstructed, that is, no further initializing is performed for the $J_{V1}$ lines.

In the process of initializing the T, no initializing of other lines is finished. Therefore, the vector lines and the legacy lines in the Showtime stage in the system do not change until initializing of the T lines is finished and the T lines enter the Showtime stage.

After the T lines enter the Showtime stage, as against the t1 time, at the t2 time, with the T removed from the non-vector lines that are in the Initializing stage, the non-vector lines that are in the Initializing stage change to $J_{L2}$; and, with the T added in the non-vector lines that are in the Showtime stage, the non-vector lines that are in the Showtime stage change to $S_{L2}$. If all $J_{L1}$ lines enter the Showtime stage at the t2 time and no new line joins in between t1 and t2, that is, the $J_{L2}$ is an empty set and the $J_{V2}$ is an empty set, the state changes to the T1 state; if any lines still exist in the $J_{L2}$, then according to the procedure described above, another group of lines T that are in the Initializing stage are selected to undergo further initializing, and the state remains at T2; and, if the $J_{L2}$ becomes an empty set and the $J_{V2}$ is not an empty set, the state changes to the T3 state.

In the T3 state, the VTU-O corresponding to the $J_{V2}$ lines is controlled so that the $J_{V2}$ lines enter the initializing process simultaneously. After initializing is finished, all $J_{V2}$ lines enter the Showtime stage.

If a vector line $S_{V2}$ in the Showtime stage already exists in the system at the t2 time, in the process of initializing the $J_{V2}$, the far-end crosstalk coefficient $C_{JV2\text{-}SV2}$ from the $J_{V2}$ to the vector line $S_{V2}$ that is currently in the data transmission stage, the far-end crosstalk coefficient $C_{SV2\text{-}JV2}$ from the $S_{V2}$ to the $J_{V2}$, and the far-end crosstalk coefficient $C_{JV2\text{-}JV2}$ between the $J_{V2}$ lines may be estimated. The $J_{V2}$ enters the Showtime stage after initializing is finished. The $C_{JV2\text{-}SV2}$ is used in signal processing to eliminate the far-end crosstalk caused by the $J_{V2}$ to the $S_{V2}$, the $C_{SV2\text{-}JV2}$ is used in signal processing to eliminate the far-end crosstalk caused by the $S_{V2}$ to the $J_{V2}$, and the $C_{JV2\text{-}JV2}$ is used in signal processing to eliminate the far-end crosstalk between the $J_{V2}$ lines.

In the process of initializing the $J_{V2}$, the far-end crosstalk coefficient $C_{SL2\text{-}JV2}$ from the $S_{L2}$ to the $J_{V2}$ may be estimated, where the $C_{SL2\text{-}JV2}$ is used in signal processing to eliminate the far-end crosstalk caused by the $S_{L2}$ to the $J_{V2}$.

In the process of initializing the $J_{V2}$, no initializing of other lines is finished. Therefore, in the period from the t2 time to the time when initializing of the $J_{V2}$ lines is finished and the $J_{V2}$ lines enter the Showtime stage, the vector lines and the legacy lines in the Showtime stage in the system do not change.

After initializing of the $J_{V2}$ lines is finished and the $J_{V2}$ lines enter the Showtime stage, as against the t2 time, at the t3 time, the $J_{V2}$ lines are removed from the vector lines that are in the Join In stage, and the $J_{V2}$ lines join in the vector lines that are in the Showtime stage, that is, the $S_{V3}$ at the t3 time is a union set of the $S_{V2}$ and the $J_{V2}$. If a new legacy line joins in within the period from t2 to t3, the $J_{L3}$ is not an empty set and the state needs to change to T2.

Figure 12:
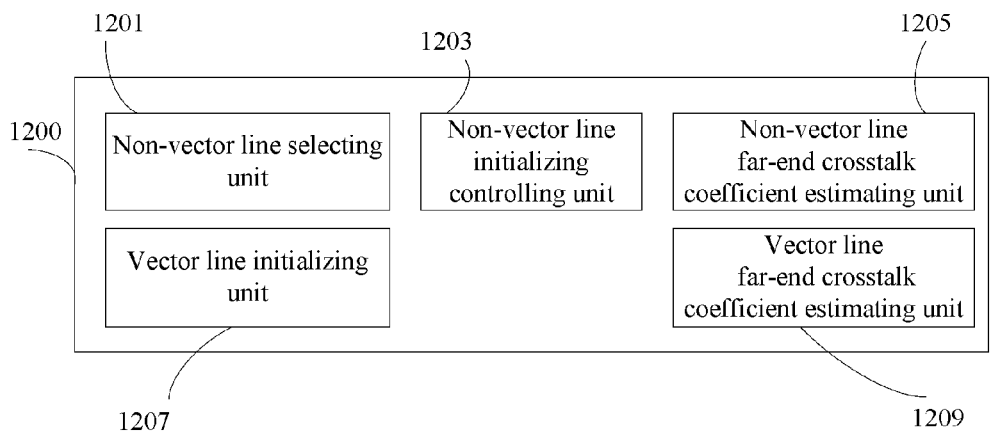
FIG. 12 is a schematic diagram of an apparatus for supporting a non-vector line according to an embodiment of the present invention.

An embodiment of the present invention provides an apparatus for supporting a non-vector line. As shown by 1200 in FIG. 12, the apparatus includes:

a non-vector line selecting unit 1201, configured to select n non-vector lines $T_L$ from lines that are in an initializing stage, where n is an integer greater than or equal to 1;

a non-vector line initializing controlling unit 1203, configured to control to perform no further initializing for other lines that are in the initializing stage except the $T_L$ until the $T_L$ fully enters a data transmission stage; and a non-vector line far-end crosstalk coefficient estimating unit 1205, configured to estimate, before the $T_L$ enters the data transmission stage, a far-end crosstalk coefficient $C_{TL\text{-}SV}$ from the $T_L$ to a vector line $S_V$ that is in the data transmission stage, where the $C_{TL\text{-}SV}$ is used in signal processing to eliminate far-end crosstalk caused by the $T_L$ to the $S_V$.

Further, the apparatus shown by 1200 may include:

a vector line initializing unit 1207, configured to control to initialize at least one vector line $T_V$ in the lines that are in the initializing stage; and a vector line far-end crosstalk coefficient estimating unit 1209, configured to estimate, before the $T_V$ enters the data transmission stage, a far-end crosstalk coefficient $C_{SL\text{-}TV}$ from the non-vector line $S_L$ that is currently in the data transmission stage to the $T_V$ and a far-end crosstalk coefficient $C_{TV\text{-}TV}$ between the lines Tv, where the $C_{SL\text{-}TV}$ is used in signal processing to eliminate far-end crosstalk caused by the $S_L$ to the $T_V$, and the $C_{TV\text{-}TV}$ is used in signal processing to eliminate far-end crosstalk between the lines Tv.

The vector line far-end crosstalk coefficient estimating unit 1209 is further configured to estimate, before the $T_V$ enters the data transmission stage, a far-end crosstalk coefficient $C_{TV\text{-}SV}$ from the $T_V$ to the vector line $S_V$ that is currently in the data transmission stage and a far-end crosstalk coefficient $C_{SV\text{-}TV}$ from the $S_V$ to the $T_V$, where the $C_{TV\text{-}SV}$ is used in signal processing to eliminate far-end crosstalk caused by the $T_V$ to the $S_V$, and the $C_{SV\text{-}TV}$ is used in signal processing to eliminate far-end crosstalk caused by the $S_V$ to the $T_V$.

The apparatus shown by 1200 may be implemented on the VCE, and the VCE controls the VTU-O-v corresponding to the vector line and the VTU-O-l corresponding to the legacy line in a unified manner so that the VTU-O-v and the VTU-O-l can perform the initializing process in a certain order for the lines connected to them, and can use the interfaces described below to perform functions related to calculation of the far-end crosstalk coefficient from the legacy line to the vector line. Through uniform control exercised by the VCE, the legacy lines in the Initializing stage and/or the vector lines in the Initializing stage finish the initializing process in a certain order.

In the embodiment of the present invention, the far-end crosstalk coefficient from a non-vector line to a vector line needs to be estimated. To estimate the far-end crosstalk coefficient from the legacy line to the vector line, the symbol of the legacy line may be synchronized with the symbol of the vector line, which can be completed by the VTU-O by controlling alignment of downlink transmitted symbols between the legacy line and the vector line. In the current VDSL2 system, a proper timing advance TA (Timing Advance) value may be set to accomplish the synchronization of uplink symbols received by the VTU-O between the legacy line and the vector line.

In addition, the VCE needs to control the legacy line and the vector line in a unified manner, so as to control the initializing process of the legacy line and the initializing process of the legacy line and the vector line in a certain order, and estimate the far-end crosstalk coefficient from the legacy line to the vector line accurately and quickly to the utmost.

In addition, to estimate the far-end crosstalk coefficient from the legacy line to the vector line accurately to the utmost, the signals sent by the legacy line on the Sync Symbol of the vector line should be randomized to the utmost.

However, on the Sync Symbol of the legacy line, the legacy line modulates a synchronization frame composed of all 0s or all 1s. The synchronization frame turns over, that is, changes from all 0s to all 1s or from all 1s to all 0s only when it is used to mark a valid timestamp of online reconfiguration sent by a peer VTU, and therefore, the downlink signals sent or the uplink signals received by the legacy line on its Sync Symbol are deficiently randomized In the downlink direction, to avoid using the deficiently randomized signals that are sent by the legacy line on its Sync Symbol, the VCE may control positions of the Sync Symbol of the legacy line in the downlink direction in a unified manner to accomplish non-alignment between the Sync Symbol of the legacy line and the Sync Symbol of the vector line (the Sync Symbol positions of all vector lines are the same). In the uplink direction, the VCE can hardly control non-alignment between the Sync Symbol of the legacy line and the Sync Symbol of the vector line.

No matter whether the VCE controls the downlink or uplink Sync Symbol positions of the legacy line to prevent the Sync Symbol from aligning with the downlink or uplink Sync Symbol of the vector line in the same direction, the embodiment of the present invention will demonstrate that under non-forced control, that is, under the condition that the Sync Symbol of the legacy line is aligned with any one of the 257 symbols, namely, 256 data symbols and 1 Sync Symbol, in a hyperframe of the vector line at equal probability, the Sync Symbol of the legacy line is not aligned with the Sync Symbol of the vector line in a majority of circumstances in the downlink direction and/or uplink direction. In this case, the frequency domain signal existent on the legacy line and corresponding to the time point of the Sync Symbol of the vector line may be a sync symbol or a data symbol, without being forced to be a non-sync symbol.

For either the downlink direction or the uplink direction, the VDSL2 and the vectored-DSL system insert a Sync Symbol every other 256 data symbols cyclically, the time length of the Data Symbols is equal to the time length of the Sync Symbols, and the Sync Symbols of all vectored DSLs keep aligned. Therefore, for any direction, when the total number of legacy lines in the Showtime stage, the Initializing stage, and the Join In stage in the current system is N, the probability $P_k$ of alignment between the Sync Symbols of k or more legacy lines and the Sync Symbols of the vector lines is:

$$P_k = \sum_{i=k}^{N} C_N^i \cdot \left(\frac{1}{257}\right)^i \cdot \left(\frac{256}{257}\right)^{N-i}$$

Through calculation, the following table is obtained:

| N | $P_2$ | $P_3$ |
|---|---|---|
| 39 | 10.2‰ | 0.48‰ |
| 50 | 16.4‰ | 1‰ |
| 92 | 50.3‰ | 5.7‰ |
| 100 | 58.3‰ | 7.2‰ |
| 113 | 72.2‰ | 10‰ |
| 137 | 100.1‰ | 16.8‰ |
| 150 | 116.3‰ | 21.3‰ |
| 200 | 183.2‰ | 44‰ |

Firstly, the deficient randomization of the signals sent on the aligned Sync Symbols of the legacy lines can affect the precision of estimating the far-end crosstalk coefficient from the legacy lines to the vector lines only when the Sync Symbols in any direction of two or more legacy lines are aligned with the Sync Symbols of the vector lines. As seen from the above table, when the number of the legacy lines in the current system is not greater than 100, the probability of the foregoing effect is not greater than 6%; and, when the number of the legacy lines in the current system is not greater than 50, the probability of the foregoing effect is not greater than 2%. Therefore, it can be obtained from the foregoing analysis that the alignment between the Sync Symbols of two or more legacy lines and the Sync Symbols of the vector lines is a low-probability event.

Secondly, if the Sync Symbols of k (k is greater than or equal to 2) legacy lines are aligned with the Sync Symbol of the vector line, the precision on K columns will be affected when the VCE estimates the crosstalk channel coefficient from the legacy line to the vector line. With reference to the probability analysis, if N legacy lines exist in the system, the number K of columns whose crosstalk channel coefficient precision is affected on average is:

$$K = \sum_{i=2}^{N} \left[ C_N^i \cdot \left(\frac{1}{257}\right)^i \cdot \left(\frac{256}{257}\right)^{N-i} \cdot i \right]$$

$$= \sum_{i=1}^{N} \left[ C_N^i \cdot \left(\frac{1}{257}\right)^i \cdot \left(\frac{256}{257}\right)^{N-i} \cdot i \right] - C_N^1 \cdot \left(\frac{1}{257}\right)^1 \cdot \left(\frac{256}{257}\right)^{N-1} \cdot 1$$

$$= \frac{N}{257} \cdot \sum_{i=1}^{N} \left[ C_{N-1}^{i-1} \cdot \left(\frac{1}{257}\right)^{i-1} \cdot \left(\frac{256}{257}\right)^{N-1-(i-1)} \right] - \frac{N}{257} \cdot \left(\frac{256}{257}\right)^{N-1}$$

$$= \frac{N}{257} \cdot \sum_{j=0}^{N-1} \left[ C_{N-1}^j \cdot \left(\frac{1}{257}\right)^j \cdot \left(\frac{256}{257}\right)^{N-1-j} \right] - \frac{N}{257} \cdot \left(\frac{256}{257}\right)^{N-1}$$

$$= \frac{N}{257} - \frac{N}{257} \cdot \left(\frac{256}{257}\right)^{N-1}$$

$$= \frac{N}{257} \cdot \left[1 - \left(\frac{256}{257}\right)^{N-1}\right]$$

For a total number N of legacy lines, the average number of affected columns K is as follows:

| N | K |
|---|---|
| 30 | 0.0125 |
| 50 | 0.0338 |
| 100 | 0.1246 |
| 150 | 0.2572 |
| 200 | 0.4200 |
| 347 | 0.9998 |
| 348 | 1.0040 |

As seen from the above table, when the total number of legacy lines is not greater than 347, the number of columns with the precision of estimating the crosstalk channel coefficient affected is less than 1 on average. In practical application, in view of the system supporting capacity, the total number of accessed users, the allocation of all users using the non-vectored ordinary VDSL2 services and the vectored-DSL service, and the online convergence ratio of users who use the ordinary VDSL2 services, N is generally not greater than 50.

Thirdly, by using a proper estimation method such as the least mean square (LMS) error algorithm, the rate of the vector lines can still be increased by using the estimated far-end crosstalk coefficient.

In summary, even if the VCE does not control whether the Sync Symbol of the legacy line in any direction is aligned with the Sync Symbol of the vector line or not, that is, no control is exercised on the alignment between the Sync Symbol of the legacy line and the Sync Symbol of the vector line, it is scarcely possible that the Sync Symbols of two or more legacy lines are aligned with the Sync Symbol of the vector line, and, when the VCE estimates the far-end crosstalk coefficient from such legacy lines to the vector line, only the precision extent is affected. On average, when the total number of lines in the system is not greater than 347, the number of columns with the precision of estimating the crosstalk channel coefficient affected is less than 1. Therefore, by applying the embodiment of the present invention, in any direction, the VCE can still estimate the far-end crosstalk coefficient from the legacy line to the vector line effectively.

Figure 13:
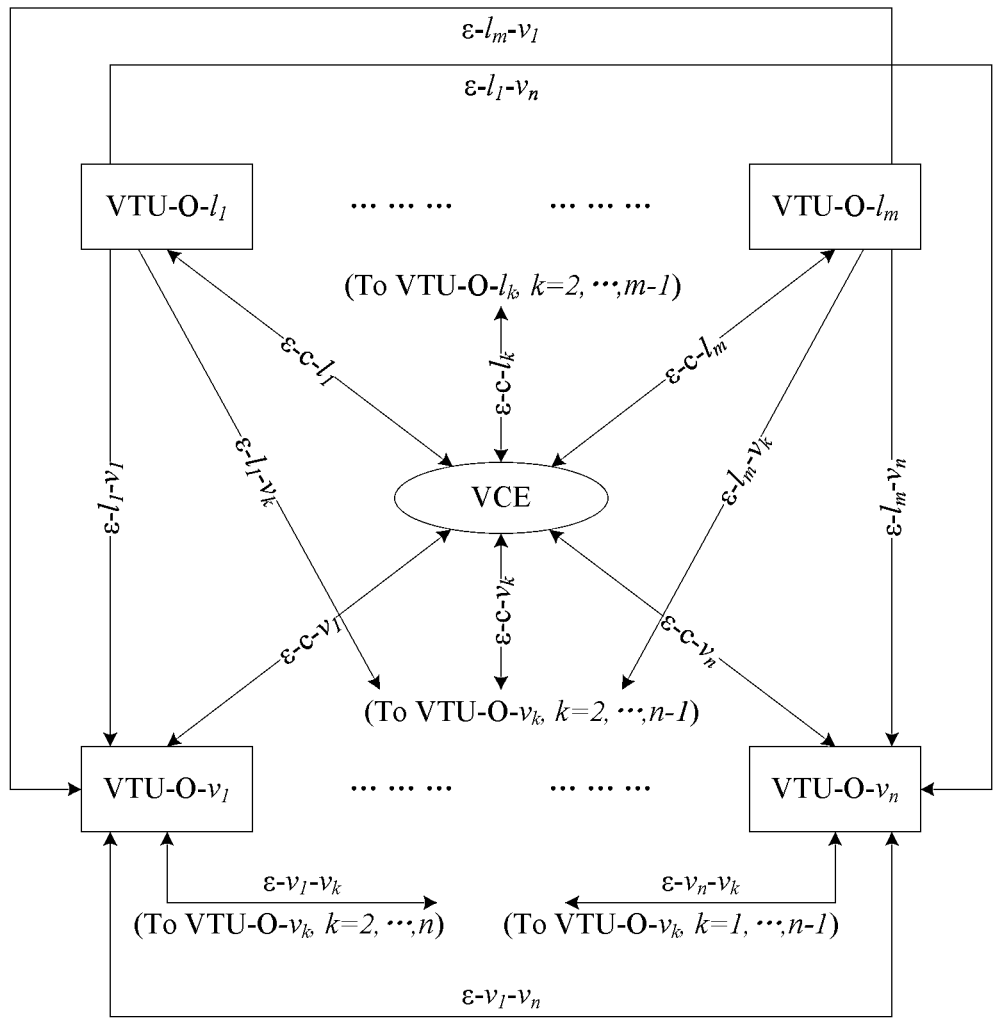
FIG. 13 is a schematic diagram of system interfaces according to an embodiment of the present invention.

FIG. 13 shows a vectored-DSL system according to an embodiment of the present invention:

The system includes n vector lines, where n is greater than or equal to 1. The VTU-O corresponding to vector line k (k=1, . . . , n) is denoted by VTU-O-$v_k$. The VCE is connected to the VTU-O-$v_k$ through an interface ∈-c-$y_k$ and controls the VTU-O-$v_k$.

The VTU-O of each vector line is connected to the VTU-O of other vector lines, where the VTU-O-$v_i$ corresponding to line i (i=1, . . . , n) is connected to the VTU-O-$v_j$ corresponding to line j (j=1, . . . , n; j≠i) through an interface ∈-$v_i$-$v_j$, and transmits the signals of line i to cancel the crosstalk of line j.

The system includes m legacy lines, where m is greater than or equal to 1. The VTU-O corresponding to legacy line k (k=1, . . . , m) is denoted by VTU-O-$l_k$. The VCE is connected to the VTU-O-$l_k$ through an interface $\epsilon$-c-$l_k$ and controls the VTU-O-$l_k$; and the VCE controls the legacy line through the VTU-O-$l_k$.

The VCE does not control whether the Sync Symbol of the legacy line is aligned with the Sync Symbol of the vector line, and the VTU-O-$l_k$ transmits a sent signal and a received signal of the legacy line in the frequency domain at the Sync Symbol time point of the vector line to the VCE through the interface $\epsilon$-c-$l_k$.

The VTU-O-$v_i$ sends an error sample of the Sync Symbol of each vector line to the VCE through the interface $\epsilon$-c-$v_i$ (i=1, . . . , n).

The VCE estimates the far-end crosstalk coefficient from the legacy line to the vector line by using the sent signal and the received signal of the legacy line in the frequency domain at the Sync Symbol time point of the vector line and the error sample corresponding to the Sync Symbol of the vector line.

The VCE sends the estimated far-end crosstalk coefficient to the corresponding VTU-O-$v_i$ through the interface $\epsilon$-c-$v_i$ (i=1, . . . , n).

The VTU-O of each legacy line interacts with the VTU-O of each vector line, where the interface between the VTU-O-$l_i$ corresponding to legacy line i (i=1, . . . , m) and the VTU-O-$v_j$ corresponding to vector line j (j=1, . . . , n) is $\epsilon$-$l_i$-$v_j$, and the VTU-O-$l_i$ transmits the sent signal and the received signal in the frequency domain on legacy line i to the VTU-O-$v_j$ through the interface $\epsilon$-$l_i$-$v_j$.

The VTU-O-$v_i$ uses the received far-end crosstalk coefficient and the sent signal and the received signal in the frequency domain on legacy line i to cancel the far-end crosstalk from the legacy line to the vector line.

The VTU-O-$v_i$ (i=1, . . . , n) uses the $\epsilon$-c-$v_i$ interface and the VTU-O-$l_j$ (j=1, . . . , m) uses the $\epsilon$-c-$l_j$ interface to report to the VCE whether the CPE used by the connected line is a vectored CPE that supports the vectored-DSL standard or a legacy CPE that does not support the vectored-DSL standard. The VCE can identify the information reported by the VTU-O, that is, the information indicating whether the CPE supports the vectored-DSL standard.

Through the interface $\epsilon$-c-$v_i$ (i=1, . . . , n) and the interface $\epsilon$-c-$l_j$ (j=1, . . . , m), the VCE controls synchronization between the downlink symbol sent by the VTU-O-$v_i$ of vector line i and the downlink symbol sent by the VTU-O-$l_j$ of legacy line j.

According to the information, through the interface $\epsilon$-c-$v_i$ (i=1, . . . , n) and the interface $\epsilon$-c-$l_j$ (j=1, . . . , m), the VCE controls non-alignment between the downlink Sync Symbol sent by the VTU-O-$v_j$ of the vector line i and the downlink Sync Symbol sent by the VTU-O-$l_j$ of legacy line j. The VTU-O may also be used to control non-alignment between the uplink Sync Symbol sent by the remote-end vector transceiver unit VTU-R (Vector Transceiver Unit at Remote) of the legacy line and the uplink Sync Symbol sent by the VTU-R of the vector line.

An embodiment of the present invention provides a method for estimating a far-end crosstalk coefficient. The method is used to estimate a far-end crosstalk coefficient of crosstalk caused by a legacy line to a vector line. As shown by 1400 in FIG. 14, the method includes the following steps:

1401. Perform no control on alignment between a Sync Symbol of a legacy line and a Sync Symbol of a vector line, and receive a signal of each legacy line, where the signal is an uplink sync symbol or a data symbol that is in a frequency domain and corresponds to a time point of an uplink Sync Symbol of the vector line, or is a sync symbol or a data symbol that is in the frequency domain and corresponds to a time point of a downlink Sync Symbol of the vector line, or is the uplink signal and the downlink signal.

For either the downlink direction or the uplink direction in 1401, no control is performed for alignment or non-alignment between the Sync Symbol of the legacy line and the Sync Symbol of the vector line, and therefore, the signal may be a Sync Symbol or a Data Symbol.

1403. Receive an error sample of each vector line, where the error sample is an uplink error sample corresponding to the uplink Sync Symbol of the vector line, or a downlink error sample corresponding to the downlink Sync Symbol of the vector line, or the uplink error sample and the downlink error sample.

1405. Use the signal and the error sample to calculate the far-end crosstalk coefficient from each legacy line to each vector line, where the far-end crosstalk coefficient is an uplink far-end crosstalk coefficient, or a downlink far-end crosstalk coefficient, or both the uplink far-end crosstalk coefficient and the downlink far-end crosstalk coefficient; the uplink signal and the uplink error sample are used to estimate the uplink far-end crosstalk coefficient; and the downlink signal and the downlink error sample are used to estimate the downlink far-end crosstalk coefficient.

In calculating the far-end crosstalk coefficient in 1405, algorithms such as a least mean square error LMS (Least Mean Square) algorithm, a matrix first-order likelihood algorithm, or a matrix inversion algorithm may be applied.

In the above embodiment, without upgrading the existing CPE of the legacy line, the far-end crosstalk coefficient from the non-vector line to the vector line can be estimated when no alignment control is performed on the Sync Symbol of the non-vector line and the Sync Symbol of the vector line to force non-alignment or alignment between the two. In this way, the far-end crosstalk from the non-vector line to the vector line is eliminated to the utmost by using the estimated crosstalk coefficient, and the vector-DSL system instability caused by the legacy line is thereby reduced to the utmost.

Figure 15:
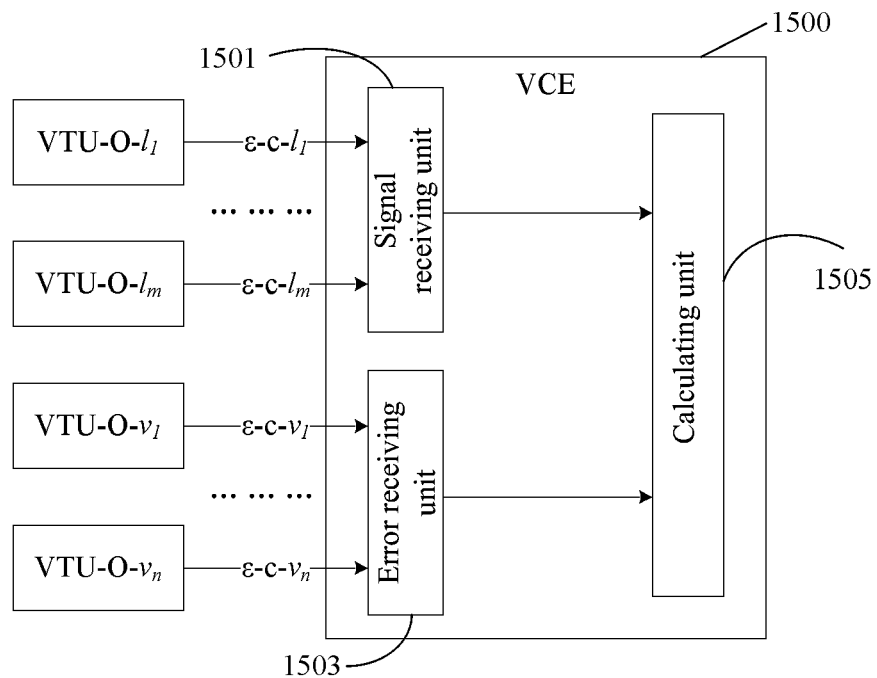
FIG. 15 is a schematic diagram of an apparatus for estimating a far-end crosstalk coefficient according to an embodiment of the present invention.

An embodiment of the present invention provides an apparatus for estimating a far-end crosstalk coefficient, where a schematic diagram of the structure of the apparatus is shown by 1500 in FIG. 15. The VTU-O-$l_i$ corresponding to legacy line i (i=1, . . . , m) transmits a signal of the non-vector line to the VCE through the interface $\epsilon$-c-$l_i$, without controlling whether the sync symbol of the non-vector line is aligned with the sync symbol of the vector line. The signal is an uplink signal that is in a frequency domain and corresponds to a time point of an uplink sync symbol of the vector line, or is a downlink signal that is in the frequency domain and corresponds to a time point of a downlink sync symbol of the vector line, or is the uplink signal and the downlink signal. The signal is received by a signal receiving unit 1501 of the VCE.

The VTU-O-$v_i$ corresponding to the vector line i (i=1, . . . , n) transmits the error sample of the vector line to the VCE through the interface $\epsilon$-c-$v_i$, where the error sample is an uplink error sample corresponding to the uplink sync symbol of the vector line, or is a downlink error sample corresponding to the downlink sync symbol of the vector line, or is the uplink error sample and the downlink error sample. The error sample is received by an error receiving unit 1503 of the VCE.

In the calculating unit 1505, the VCE uses the received signal and error sample to calculate the far-end crosstalk coefficient from the legacy line to the vector line.

Figure 16:
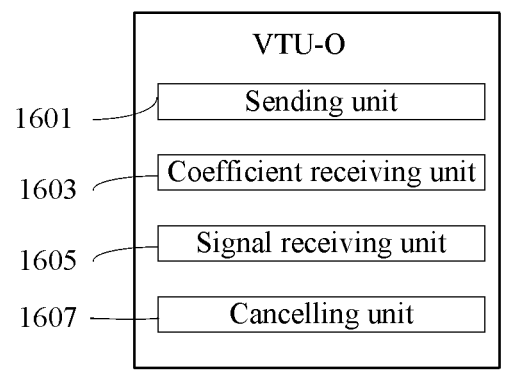
FIG. 16 is a schematic diagram of a VTU-O according to an embodiment of the present invention.

An embodiment of the present invention provides a VTU-O of a vector line. As shown in FIG. 16, the VTU-O includes:

a sending unit 1601, configured to send an error sample of the vector line, where the error sample is an uplink error sample corresponding to the uplink sync symbol of the vector line, or a downlink error sample corresponding to the downlink sync symbol of the vector line, or the uplink error sample and the downlink error sample;

a coefficient receiving unit 1603, configured to receive the far-end crosstalk coefficient from the legacy line to the line, where the far-end crosstalk coefficient is an uplink far-end crosstalk coefficient or a downlink far-end crosstalk coefficient, or both an uplink far-end crosstalk coefficient and a downlink far-end crosstalk coefficient;

a signal receiving unit 1605, configured to receive a signal that includes data symbols and sync symbols from the legacy line, where the signal is an uplink signal, or a downlink signal, or an uplink and downlink signal; and a cancelling unit 1607, configured to use the far-end crosstalk coefficient and the signal to cancel interference caused by the far-end crosstalk to the vector line.

Figure 17:
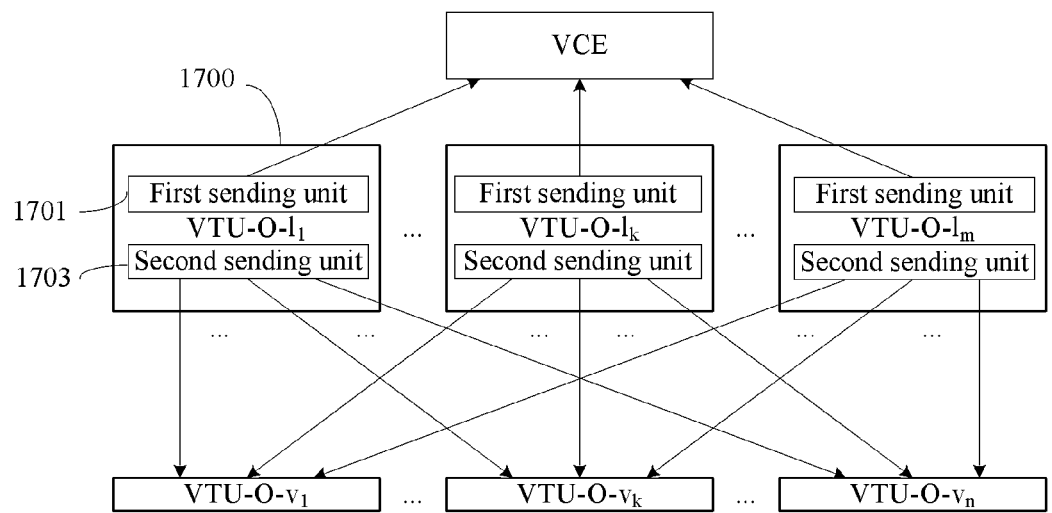
FIG. 17 is a schematic diagram of a VTU-O according to an embodiment of the present invention.

An embodiment of the present invention provides a VTU-O of a legacy line. As shown by 1700 in FIG. 17, the VTU-O includes:

a first sending unit 1701, configured to send a first signal of a legacy line, where the first signal is an uplink signal that is in a frequency domain and corresponds to a time point of an uplink Sync Symbol of a vector line, or is a downlink signal that is in the frequency domain and corresponds to a time point of a downlink Sync Symbol of the vector line, or is the uplink signal and the downlink signal, and the first signal is a signal in a circumstance that no control is exercised on whether the Sync Symbol of the non-vector line is aligned with the sync symbol of the vector line;

a second sending unit 1703, configured to send a second signal of the legacy line, where the second signal is a downlink signal, or an uplink signal, or an uplink and downlink signal, and the uplink signal and the downlink signal include a data symbol and a sync symbol.

After the crosstalk coefficient is estimated, the VCE transmits the estimated far-end crosstalk coefficient to the VTU-O-$v_i$ corresponding to vector line i through the interface $\epsilon$-c-$v_i$ (i=1, . . . , n).

Figure 18:
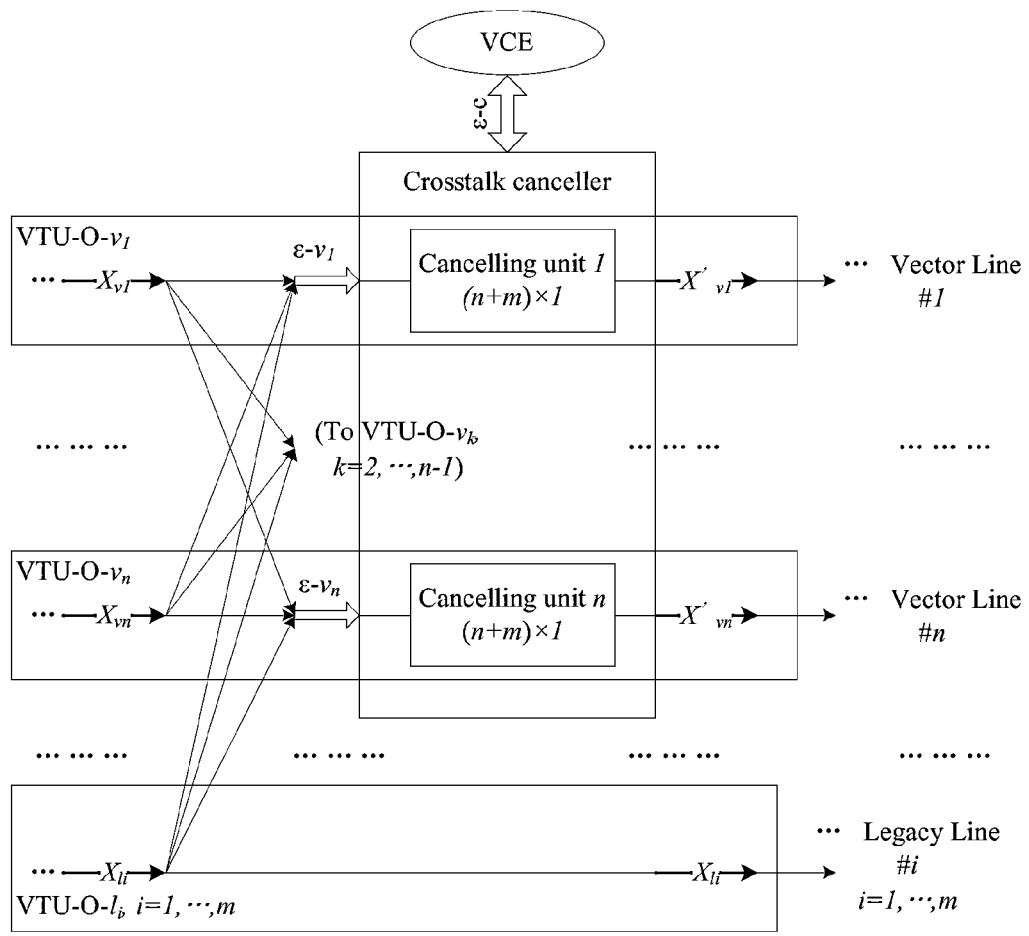
FIG. 18 is a schematic diagram of cancelling downlink crosstalk according to an embodiment of the present invention.

FIG. 18 shows a scenario of cancelling downlink crosstalk in a system according to an embodiment of the present invention. Each cancelling unit cancels crosstalk generated by their respective line. A cancelling unit i (i=1, . . . , n) is used to cancel crosstalk on vector line i. The cancelling unit i may be located in the VTU-O-$v_i$ and the cancelling unit is an (n+m)×1 cancelling unit, and, by using signals that include all vector line signals and all legacy line signals, and a cancellation coefficient from all lines that include all vector lines and all legacy lines to vector line i, perform the following crosstalk cancellation, that is, perform a multiplication and summation operation:

$$X'_{vi} = \sum_{j=1}^{n} p_{vj-vi} X_{vj} + \sum_{j=1}^{m} p_{lj-vi} X_{lj}$$

where $p_{vj-vi}$ is a far-end crosstalk coefficient from vector line j to vector line i, $p_{lj-vi}$ is a far-end crosstalk coefficient from legacy line j to vector line i, $X_{vj}$ is signal data input from vector line j into the canceller, $X_{lj}$ is signal data input from legacy line j into the canceller, $X'_{vi}$ is signal data output by the canceller of vector line i, and $p_{vi-vi}$ may be set to 1 or another value. All n cancelling units form a canceller that is in a matrix form:

$$\tilde{x}_V = P_{V-V} x_V + P_{L-V} x_L$$

where $P_{V-V}$ is a far-end crosstalk coefficient between the vector lines, $P_{L-V}$ is a far-end crosstalk coefficient from a legacy line to a vector line, $x_V$ is signal data input from the vector line into the canceller, $x_L$ is signal data input from the legacy line into the canceller, and $\tilde{x}_V$ is signal data output by the canceller of the vector line.

The VCE transmits the calculated far-end crosstalk coefficient from the legacy line to the vector line to the VTU-O corresponding to the vector line through the interface $\epsilon$-c-$v_k$ (k=1, . . . , n), denoted by $\epsilon$-c.

Between the VTU-Os corresponding to the vector line, the $i^{th}$ (i=1, . . . , n) VTU-O-$v_i$ is connected to the $j^{th}$ (j=1, . . . , n; j≠i) VTU-O-$v_j$ through the interface $\epsilon$-$v_i$-$v_j$, and transmits the $i^{th}$ line signal to the $j^{th}$ line to cancel crosstalk of the $j^{th}$ line.

Through the interface $\epsilon$-$l_i$-$v_j$ (i=1, . . . , m, j=1, . . . , n), the VTU-O-$l_i$ transmits the sent signal and the received signal in the frequency domain of the $i^{th}$ legacy line to the VTU-O-$v_j$ to cancel the crosstalk from the legacy line to the vector line. The VTU-O-$v_j$ uses the signals and the far-end crosstalk coefficient from the legacy line to the vector line to cancel the crosstalk of the legacy line.

The $k^{th}$ interface $\epsilon$-$v_k$ (k=1, . . . , n) aggregates signals for crosstalk cancellation of m interfaces $\epsilon$-$l_i$-$y_k$ (i=1, . . . , m) and n−1 interfaces $\epsilon$-$v_j$-$v_k$ (j=1, . . . , n; j≠k), where the signals are used to cancel crosstalk within the canceller.

FIG. 18 shows an example of a downlink scenario. An uplink scenario can be easily inferred by a person skilled in the art according to the downlink scenario.

In the embodiment of the present invention, without upgrading the VDSL2 legacy CPE in the live network of the VDSL2, the vectored-DSL system can select some non-vector lines for initializing, and perform no further initializing for other lines in the process of initializing the selected non-vector lines, thereby controlling orderly initializing of legacy lines. Meanwhile, the interference caused by initializing of other lines onto the initializing of the selected line can be reduced. In estimating the far-end crosstalk coefficient, a better estimation result can be achieved, and therefore, the existing VDSL legacy CPE in the live network is supported, the crosstalk from the legacy line to the vector line in the downlink direction and the crosstalk from the legacy line to the vector line in the uplink direction are cancelled to the utmost, and the impact caused by the legacy line onto stability of the vector line in the entire vectored-DSL system is reduced to the utmost.

Through the foregoing description of the embodiments, a person skilled in the art is clearly aware that the present invention may be implemented through software in addition to a necessary hardware platform, or all through hardware. Based on such an understanding, all or a part of the technical solutions of the present invention contributing to the prior art may be implemented in a form of a software product. The computer software product may be stored in a storage medium, such as a ROM/RAM, a magnetic disk, and an optical disk, and include several instructions for instructing a computer device (which may be a personal computer, a server, or a network device) to perform the methods described in each embodiment or certain parts of the embodiments of the present invention.

The foregoing descriptions are merely exemplary specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for supporting a non-vector line, comprising:
    selecting n non-vector lines $T_L$ from a plurality of lines that are in an initializing stage, wherein n is an integer greater than or equal to 1;
    controlling to perform no further initializing for other lines that are in the initializing stage except the $T_L$ until the $T_L$ fully enters a data transmission stage; and
    before the $T_L$ enters the data transmission stage, estimating a far-end crosstalk coefficient $C_{TL-SV}$ from the $T_L$ to a vector line $S_V$ that is in the data transmission stage including:
        performing no control on alignment between a sync symbol of the non-vector line and a sync symbol of the vector line, and receiving a frequency domain signal existent on the $T_L$ and corresponding to a time point of the sync symbol of the vector line;
        receiving an error sample of the sync symbol of the $S_V$; and
        using the signal and the error sample to calculate the $C_{TL-SV}$,
    wherein the $C_{TL-SV}$ is used in signal processing to eliminate far-end crosstalk caused by the $T_L$ to the $S_V$.

2. The method according to claim 1, wherein: before the $T_L$ enters the data transmission stage, the estimating a far-end crosstalk coefficient $C_{TL-SV}$ from the $T_L$ to a vector line $S_V$ that is in the data transmission stage further comprises:
    in only a channel discovery stage of the $T_L$ initializing process, estimating the far-end crosstalk coefficient $C_{TL-SV}$ from the $T_L$ to the vector line $S_V$ that is in the data transmission stage; or
    in the channel discovery stage and a training stage of the $T_L$ initializing process, estimating twice the far-end crosstalk coefficient $C_{TL-SV}$ from the $T_L$ to the vector line $S_V$ that is in the data transmission stage.

3. The method according to claim 1, further comprising:
    controlling to initialize at least one vector line $T_V$ in the plurality of lines that are in the initializing stage; and
    before the $T_V$ enters the data transmission stage, estimating a far-end crosstalk coefficient $C_{SL-TV}$ from the non-vector line $S_L$ that is in the data transmission stage to the $T_V$ and a far-end crosstalk coefficient $C_{TV-TV}$ between the lines Tv, wherein the $C_{SL-TV}$ is used in signal processing to eliminate far-end crosstalk caused by the $S_L$ to the $T_V$, and the $C_{TV-TV}$ is used in signal processing to eliminate far-end crosstalk between the lines Tv.

4. The method according to claim 3, wherein: before the $T_V$ enters the data transmission stage, the method comprises:
    being in a training stage of the $T_V$ initializing process.

5. The method according to claim 3, wherein the estimating a far-end crosstalk coefficient $C_{SL-TV}$ from the non-vector line $S_L$ that is in the data transmission stage to the $T_V$ comprises:
    performing no control on alignment between a sync symbol of the non-vector line and a sync symbol of the vector line, and receiving a frequency domain signal existent on the $S_L$ and corresponding to a time point of the sync symbol of the vector line;
    receiving an error sample of the sync symbol of the $T_V$; and
    using the signal and the error sample to calculate the $C_{SL-TV}$.

6. The method according to claim 3, further comprising:
    before the $T_V$ enters the data transmission stage, estimating a far-end crosstalk coefficient $C_{TV-SV}$ from the $T_V$ to the vector line $S_V$ that is in the data transmission stage and a far-end crosstalk coefficient $C_{SV-TV}$ from the $S_V$ to the $T_V$, wherein the $C_{TV-SV}$ is used in signal processing to eliminate far-end crosstalk caused by the $T_V$ to the $S_V$, and the $C_{SV-TV}$ is used in signal processing to eliminate far-end crosstalk caused by the $S_V$ to the $T_V$.

7. The method according to claim 1, wherein the controlling to perform no further initializing for other lines that are in the initializing stage except the $T_L$ comprises:
    controlling an optical network unit-side VDSL2 transceiver unit VTU-O not to send a handshake signal to other lines;
    or, controlling a VTU-O to prevent other lines from entering a channel discovery stage or staying in the channel discovery stage.

8. An apparatus for supporting a non-vector line, comprising:
    at least one processor including:
    a non-vector line selector, configured to select n non-vector lines $T_L$ from a plurality of lines that are in an initializing stage, wherein n is an integer greater than or equal to 1;
    a non-vector line initializing controller, configured to control to perform no further initializing for other lines that are in the initializing stage except the $T_L$ until the $T_L$ fully enters a data transmission stage; and
    a non-vector line far-end crosstalk coefficient estimator, configured to estimate, before the $T_L$ enters the data transmission stage, a far-end crosstalk coefficient $C_{TL-SV}$ from the $T_L$ to a vector line $S_V$ that is in the data transmission stage including:
        a signal receiver, configured to receive, without performing control on alignment between a sync symbol of the non-vector line and a sync symbol of the vector line, a frequency domain signal existent on the $T_L$ and corresponding to a time point of the sync symbol of the vector line;
        an error receiver, configured to receive an error sample of the sync symbol of the $S_V$; and
        a calculator, configured to use the signal and the error sample to calculate the $C_{TL-SV}$,
    wherein the $C_{TL-SV}$ is used in signal processing to eliminate far-end crosstalk caused by the $T_L$ to the $S_V$.

9. The apparatus according to claim 8, further comprising:
    a vector line initializer, configured to control to initialize at least one vector line $T_V$ in the plurality of lines that are in the initializing stage; and
    a vector line far-end crosstalk coefficient estimator, configured to estimate, before the TV enters the data transmission stage, a far-end crosstalk coefficient $C_{SL-TV}$ from the non-vector line $S_L$ that is in the data transmission stage to the $T_V$ and a far-end crosstalk coefficient $C_{TV-TV}$ between the lines Tv, wherein the $C_{SL-TV}$ is used in signal processing to eliminate far-end crosstalk caused by the $S_L$ to the $T_V$, and the $C_{TV-TV}$ is used in signal processing to eliminate far-end crosstalk between the lines Tv.

10. The apparatus according to claim 9, wherein the vector line far-end crosstalk coefficient estimator is further configured to estimate, before the $T_V$ enters the data transmission stage, a far-end crosstalk coefficient $C_{TV\text{-}SV}$ from the $T_V$ to the vector line $S_V$ that is in the data transmission stage and a far-end crosstalk coefficient $C_{SV\text{-}TV}$ from the $S_V$ to the $T_V$, wherein the $C_{TV\text{-}SV}$ is used in signal processing to eliminate far-end crosstalk caused by the $T_V$ to the $S_V$, and the $C_{SV\text{-}TV}$ is used in signal processing to eliminate far-end crosstalk caused by the $S_V$ to the $T_V$.

11. A system for supporting a non-vector line, comprising:
a vectoring control entity VCE;
at least two lines;
an ONU-side vector transceiver unit VTU-O-v; and
an ONU-side vector transceiver unit VTU-O-l,
wherein:
  the at least two lines comprise at least one vector line and at least one non-vector line, wherein the at least one vector line is connected to the VTU-O-v and controlled by the VTU-O-v, and the at least one non-vector line is connected to the VTU-O-l and controlled by the VTU-O-l;
  the VCE selects n non-vector lines $T_L$ from a plurality of lines that are in an initializing stage, wherein n is an integer greater than or equal to 1;
  the VCE controls ONU-side vector transceiver units corresponding to other lines that are in the initializing stage except the $T_L$, so as to perform no further initializing for the other lines until the $T_L$ fully enters a data transmission stage; and
  before the $T_L$ enters the data transmission stage, the VCE estimates a far-end crosstalk coefficient $C_{TL\text{-}SV}$ from the $T_L$ to a vector line $S_V$ that is in the data transmission stage, wherein the $C_{TL\text{-}SV}$ is used in signal processing to eliminate far-end crosstalk caused by the $T_L$ to the $S_V$ including:
  performing, by the VCE, no control on alignment between a sync symbol of the non-vector line and a sync symbol of the vector line, and transmitting, by the VTU-O-l, a frequency domain signal existent on the TL and corresponding to a time point of the sync symbol of the vector line to the VCE;
  transmitting, by the VTU-O-v, an error sample of the sync symbol of the SV to the VCE; and
  using, by the VCE, the signal and the error sample to calculate the CTL-SV.

* * * * *